(12) United States Patent
Park et al.

(10) Patent No.: US 9,037,458 B2
(45) Date of Patent: May 19, 2015

(54) SYSTEMS, METHODS, APPARATUS, AND COMPUTER-READABLE MEDIA FOR SPATIALLY SELECTIVE AUDIO AUGMENTATION

(75) Inventors: Hyun Jin Park, San Diego, CA (US); Kwokleung Chan, San Diego, CA (US); Ren Li, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 168 days.

(21) Appl. No.: 13/401,688

(22) Filed: Feb. 21, 2012

(65) Prior Publication Data

US 2012/0215519 A1    Aug. 23, 2012

Related U.S. Application Data

(60) Provisional application No. 61/445,974, filed on Feb. 23, 2011.

(51) Int. Cl.
| | |
|---|---|
| *G10L 21/02* | (2013.01) |
| *H04H 40/72* | (2008.01) |
| *H04B 15/00* | (2006.01) |
| *G06F 17/28* | (2006.01) |
| *G10K 11/178* | (2006.01) |
| *G10L 21/0208* | (2013.01) |
| *H04R 1/10* | (2006.01) |
| *H04R 3/00* | (2006.01) |
| *H04R 5/033* | (2006.01) |
| *G10L 21/0216* | (2013.01) |

(52) U.S. Cl.
CPC .......... *G06F 17/289* (2013.01); *G10K 11/1784* (2013.01); *G10L 21/0208* (2013.01); *G10L 2021/02166* (2013.01); *H04R 1/1083* (2013.01); *H04R 3/005* (2013.01); *H04R 5/033* (2013.01); *H04R 2460/01* (2013.01)

(58) Field of Classification Search
CPC ....................................................... G06F 17/28
See application file for complete search history.

(56) References Cited

U.S. PATENT DOCUMENTS

| | | | |
|---|---|---|---|
| 7,050,966 B2 * | 5/2006 | Schneider et al. | 704/200.1 |
| 7,149,691 B2 * | 12/2006 | Balan et al. | 704/270 |
| 7,206,421 B1 * | 4/2007 | Taenzer | 381/119 |
| 7,415,123 B2 * | 8/2008 | Ballas | 381/309 |
| 7,756,274 B2 * | 7/2010 | Layton et al. | 381/17 |
| 8,139,787 B2 * | 3/2012 | Haykin et al. | 381/94.1 |
| 8,140,327 B2 * | 3/2012 | Kennewick et al. | 704/226 |
| 2003/0227476 A1 * | 12/2003 | Wilcock et al. | 345/727 |
| 2006/0271370 A1 | 11/2006 | Li | |

(Continued)

FOREIGN PATENT DOCUMENTS

| | | |
|---|---|---|
| EP | 1083769 A1 | 3/2001 |
| JP | H049834 A | 1/1992 |

(Continued)

OTHER PUBLICATIONS

Fohl, Wolfgang, Jörn Matthies, and Bernd Schwarz. "A FPGA-based adaptive noise cancelling system." Proc. of the 12th Int. Conference on Digital Audio Effects (DAFx-09). 2009.*

Riikonen, Ville, Mikka Tikander, and Matti Karjalainen. "An augmented reality audio mixer and equalizer." 124th Audio Engineering Society Convention. 2008.*

(Continued)

*Primary Examiner* — Brian Albertalli
(74) *Attorney, Agent, or Firm* — Austin Rapp & Hardman

(57) ABSTRACT

Spatially selective augmentation of a multichannel audio signal is described.

48 Claims, 28 Drawing Sheets

(56) References Cited

U.S. PATENT DOCUMENTS

| | | |
|---|---|---|
| 2009/0262946 A1 | 10/2009 | Dunko |
| 2010/0002886 A1 | 1/2010 | Doclo et al. |
| 2010/0027821 A1 | 2/2010 | Fischer et al. |
| 2010/0131269 A1 | 5/2010 | Park et al. |
| 2010/0183178 A1 | 7/2010 | Kellermann et al. |
| 2010/0185432 A1 | 7/2010 | Almagro |
| 2010/0296668 A1 | 11/2010 | Lee et al. |
| 2011/0002473 A1 | 1/2011 | Nakatani et al. |
| 2011/0007907 A1 | 1/2011 | Park et al. |
| 2011/0288860 A1 | 11/2011 | Schevciw et al. |
| 2011/0293103 A1 | 12/2011 | Park et al. |
| 2012/0029912 A1* | 2/2012 | Almagro ............... 704/226 |
| 2012/0051561 A1* | 3/2012 | Cohen et al. ............ 381/122 |
| 2013/0114821 A1* | 5/2013 | Hamalainen ........... 381/71.6 |

FOREIGN PATENT DOCUMENTS

| | | |
|---|---|---|
| JP | H0416900 B2 | 3/1992 |
| JP | H06233388 A | 8/1994 |
| JP | H10126893 A | 5/1998 |
| JP | H11249693 A | 9/1999 |
| JP | 2010506526 A | 2/2010 |
| WO | WO9326085 A1 | 12/1993 |
| WO | 0049834 A1 | 8/2000 |
| WO | WO-2008043758 A1 | 4/2008 |
| WO | WO2008119122 A1 | 10/2008 |

OTHER PUBLICATIONS

Harma, Aki, et al. "Techniques and applications of wearable augmented reality audio." Audio Engineering Society Convention 114. Audio Engineering Society, 2003.*

Vassiliou, Marius S., et al. "Integrated multimodal human-computer interface and Augmented Reality for interactive display applications." AeroSense 2000. International Society for Optics and Photonics, 2000.*

Härmä, Aki, et al. "Augmented reality audio for mobile and wearable appliances." Journal of the Audio Engineering Society 52.6 (2004): 618-639.*

Fridman E. et al. "Time-scale and pitch-scale modification of speech", Available online on Feb. 21, 2012 at http://spl.telhai.ac.il/speech/project_summary/links_comments/TPSM_Matlab_Conference_1999.doc.

Harma A. et al. "Augmented Reality Audio for Mobile and Wearable Appliances", J. Audio Eng. Soc., vol. 52, No. 6, Jun. 2004, pp. 618-639.

Ninness, B. et al. "Time-Scale Modification of Speech Signals", IEEE Trans. on Sig. Proc., vol. 56, No. 4, Apr. 2008, pp. 1479-1488.

Richardson, B. "The Potential Use of Slow-down Technology to Improve Pronounciation of English for International Communication", Ph.D thesis, Dublin Institute of Technology, Jul. 1, 2009.

International Search Report and Written Opinion—PCT/US2012/026120—ISA/EPO—Jun. 5, 2012.

* cited by examiner

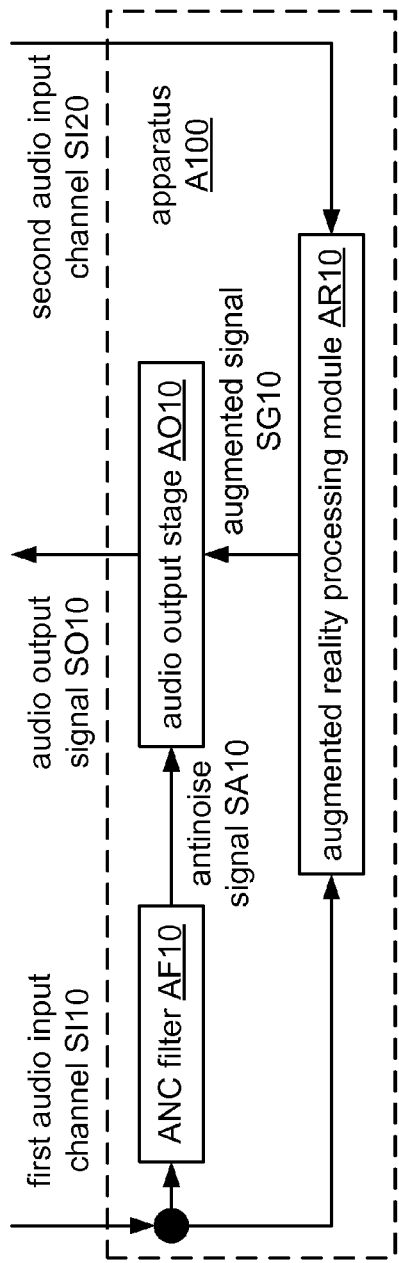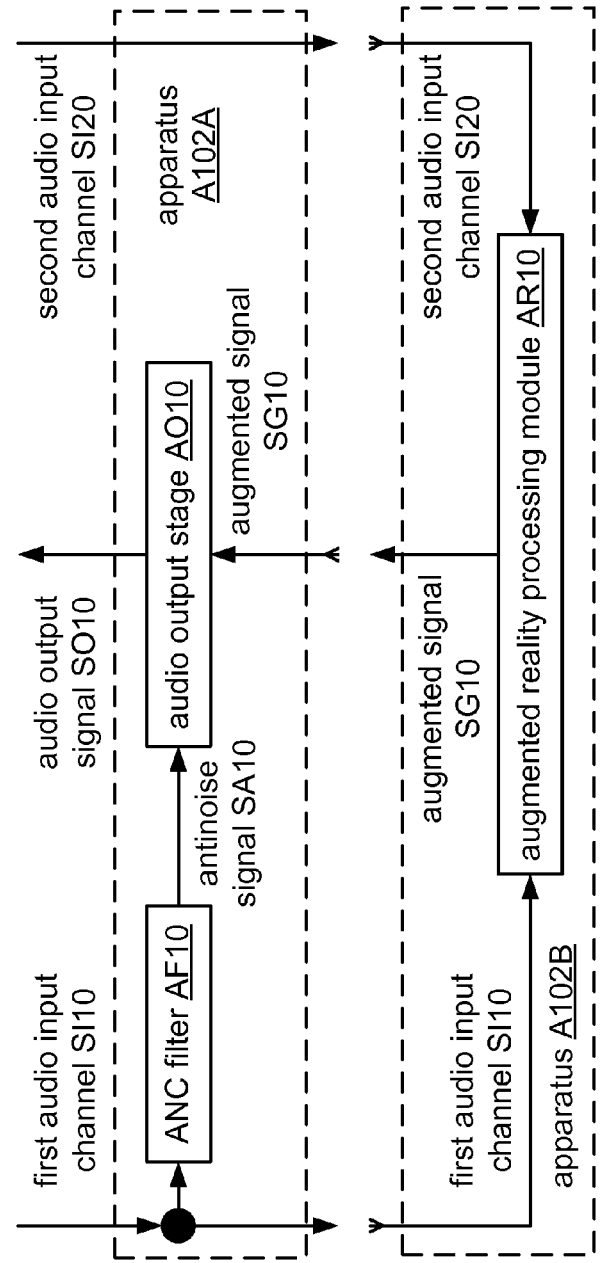

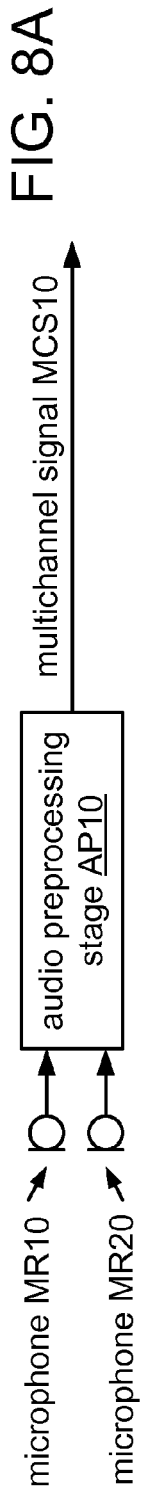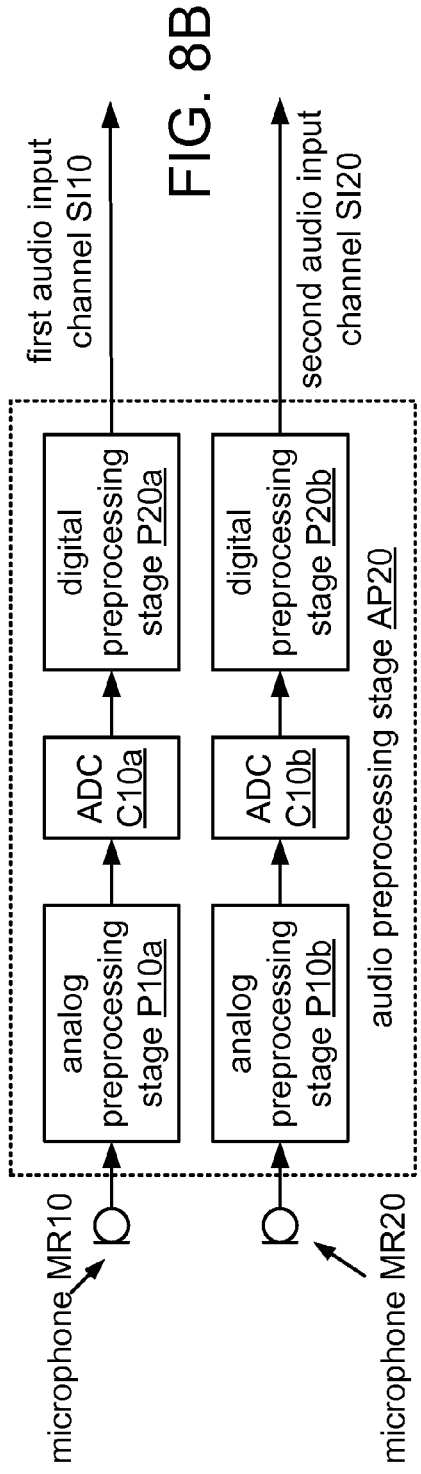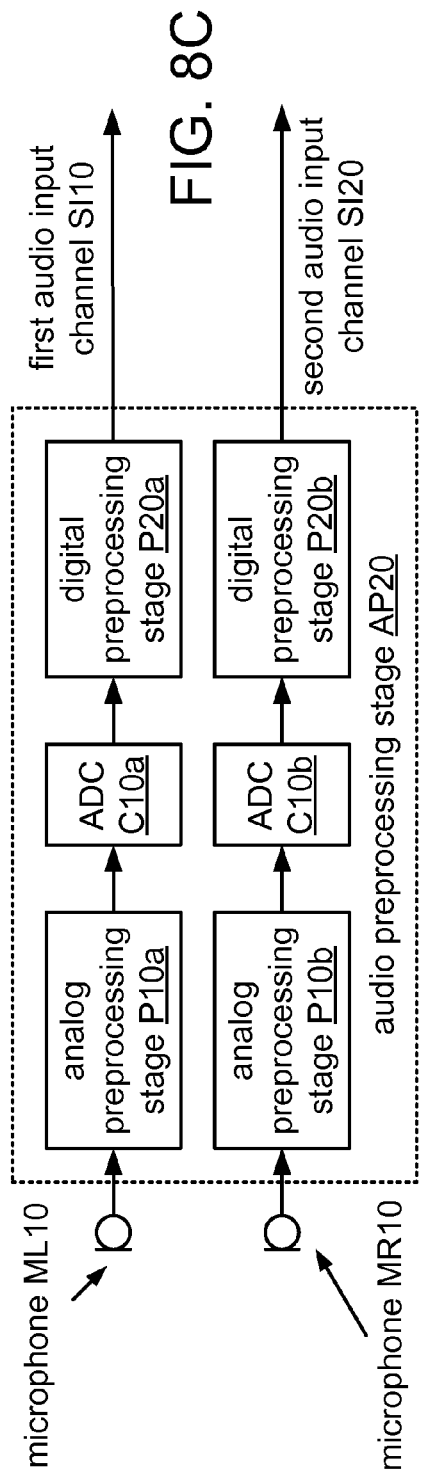

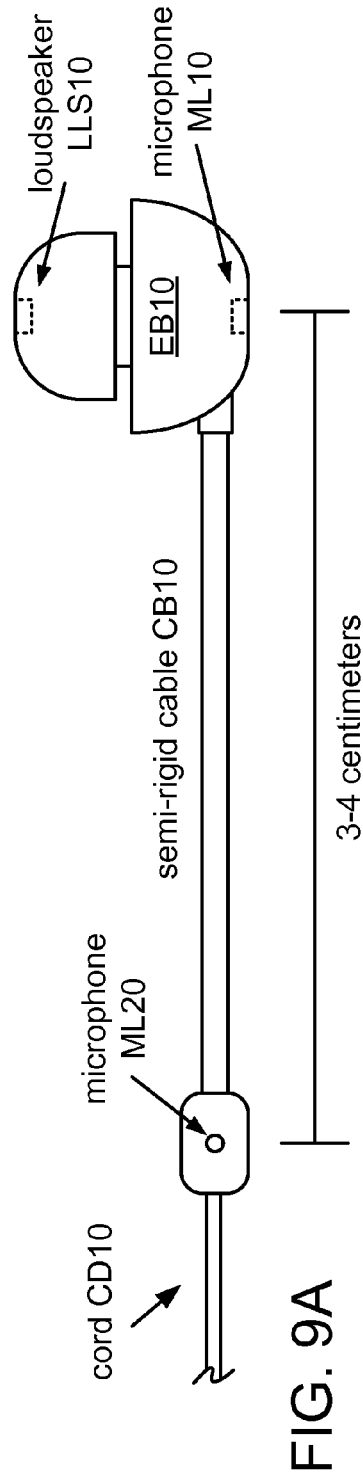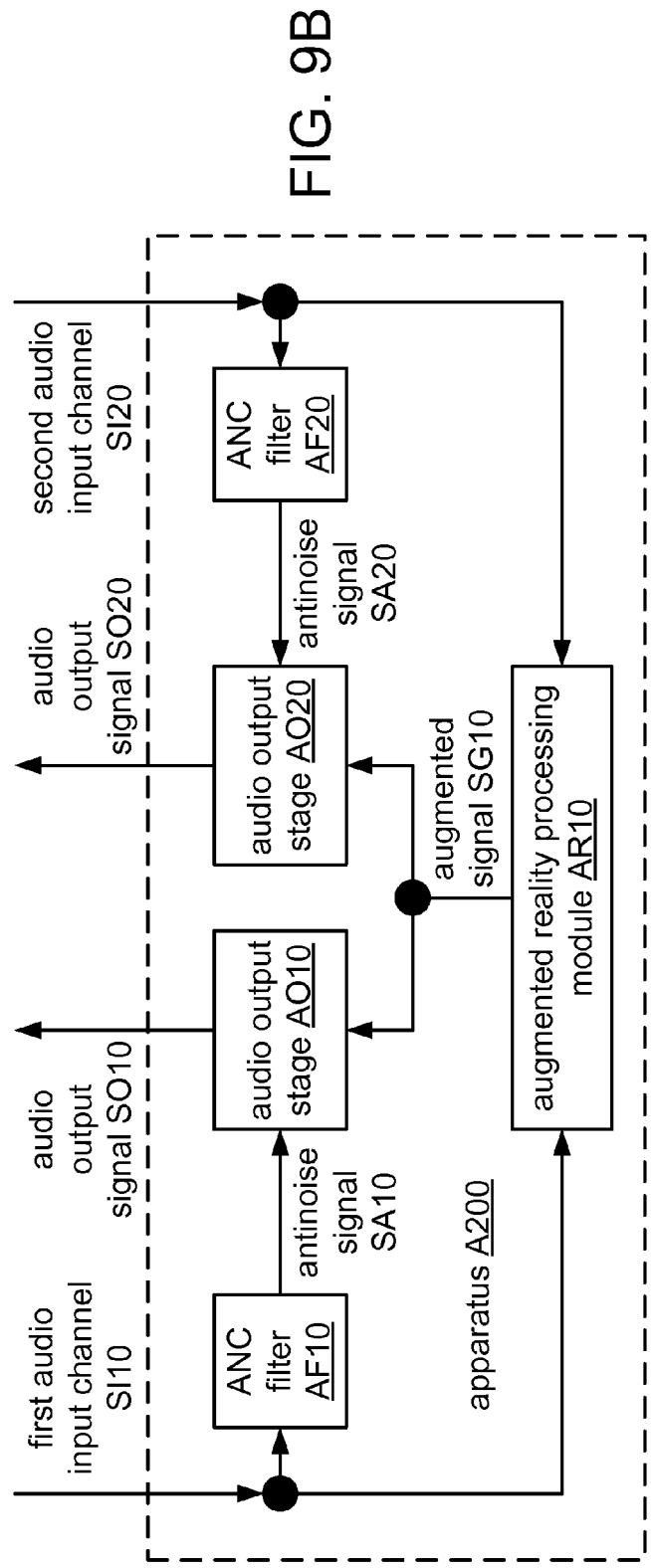

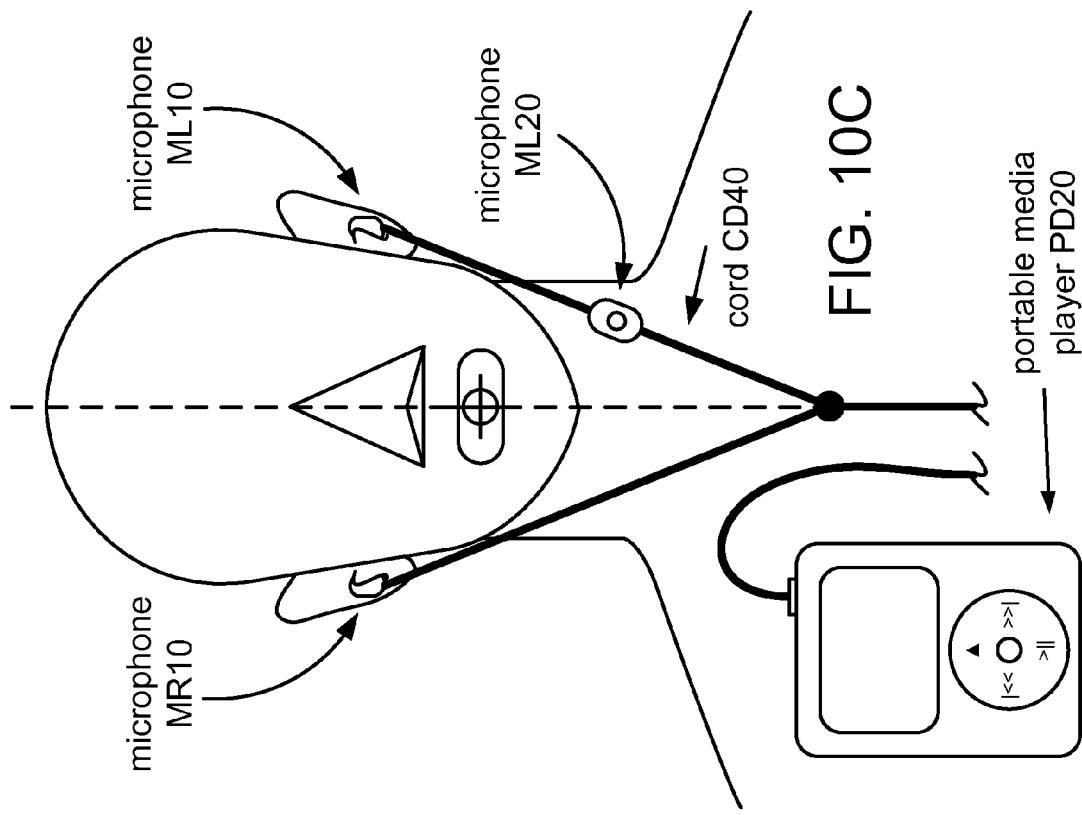
FIG. 10C
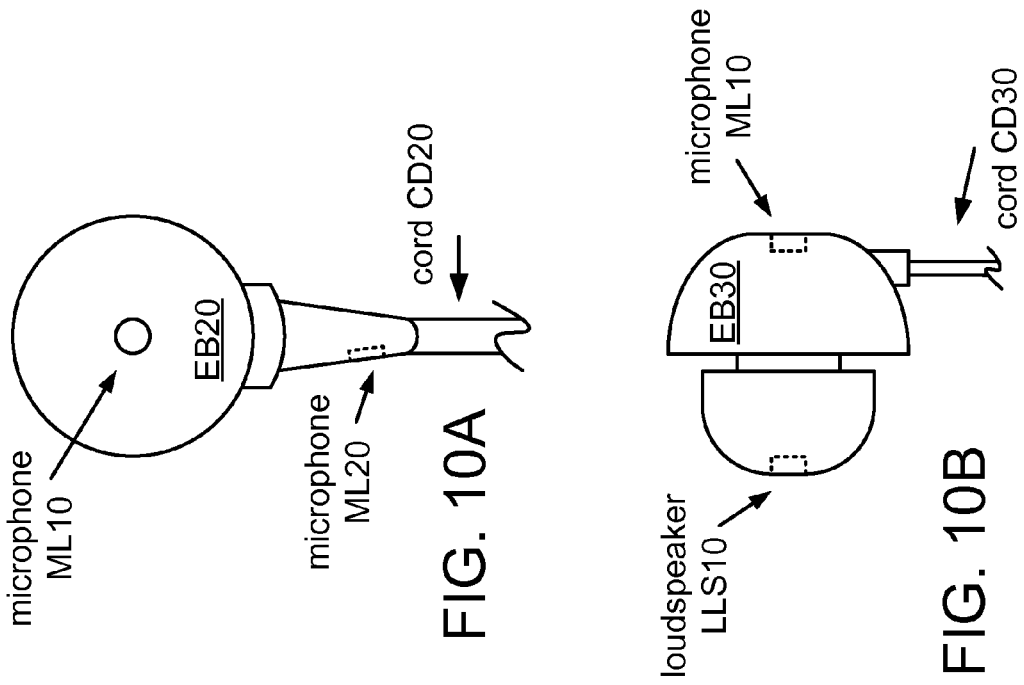
FIG. 10A
FIG. 10B

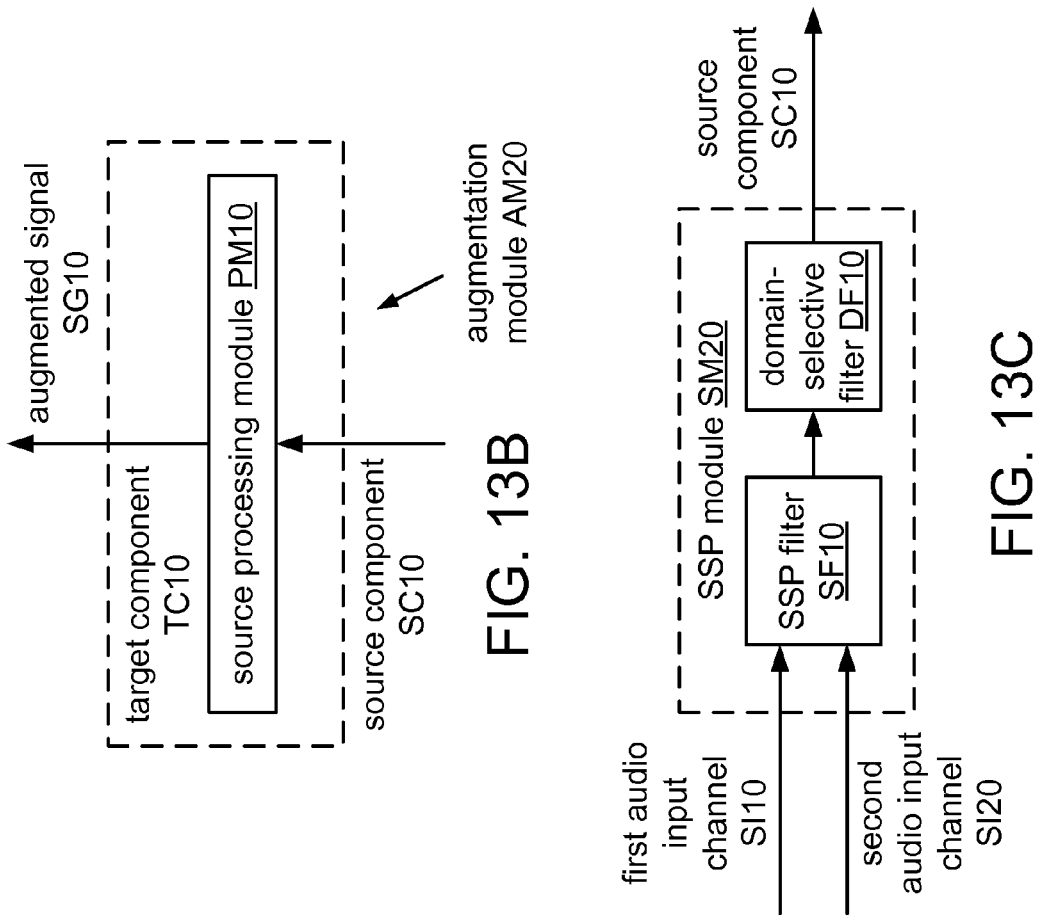
FIG. 13B
FIG. 13C
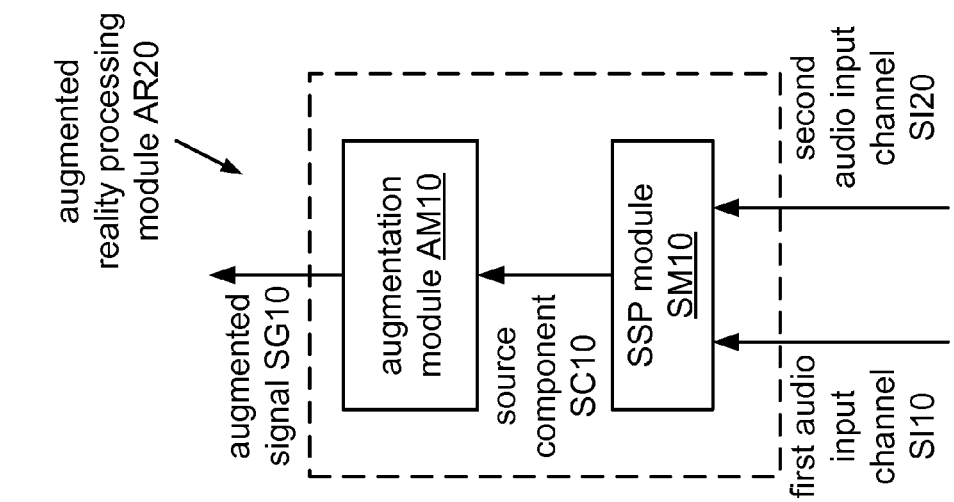
FIG. 13A

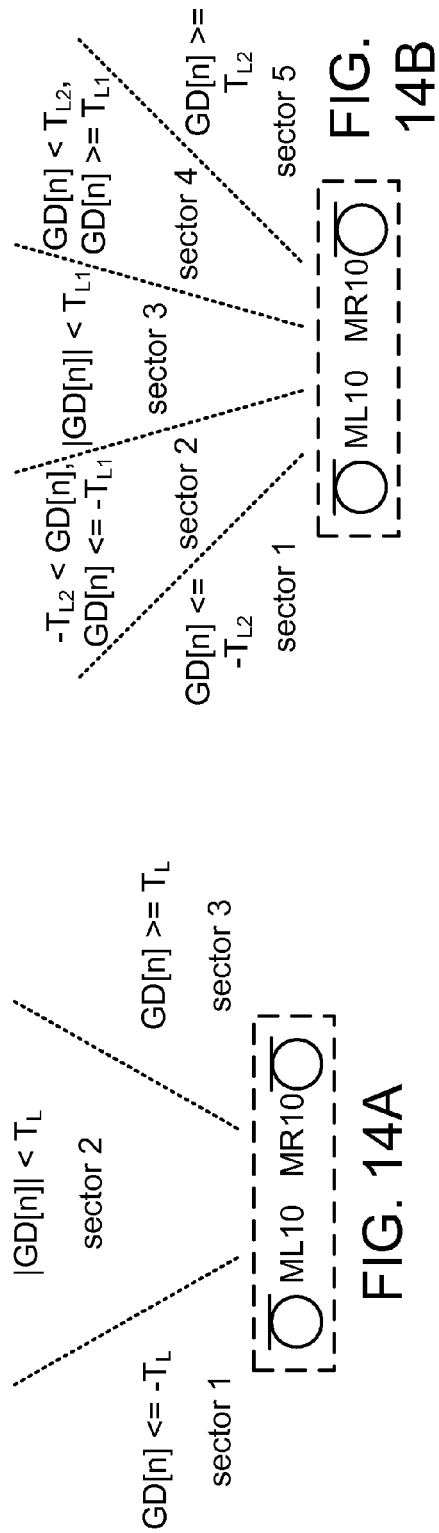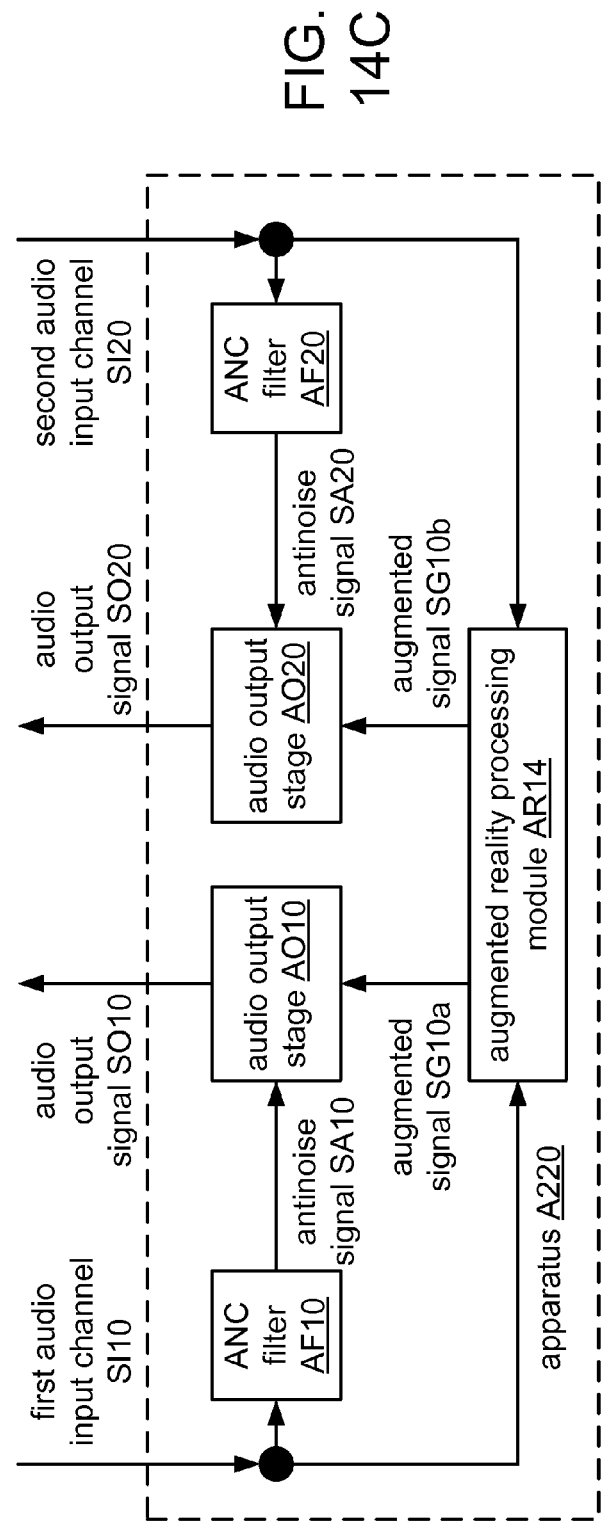

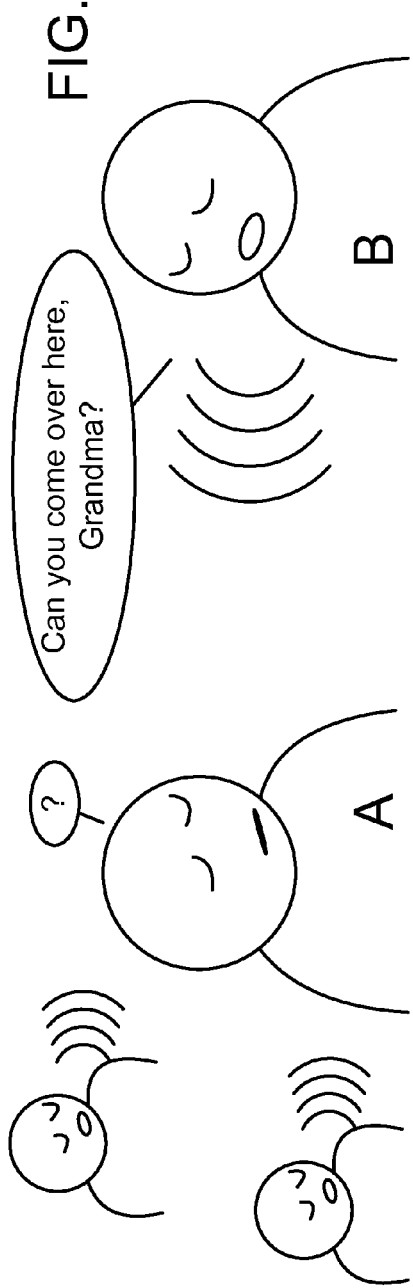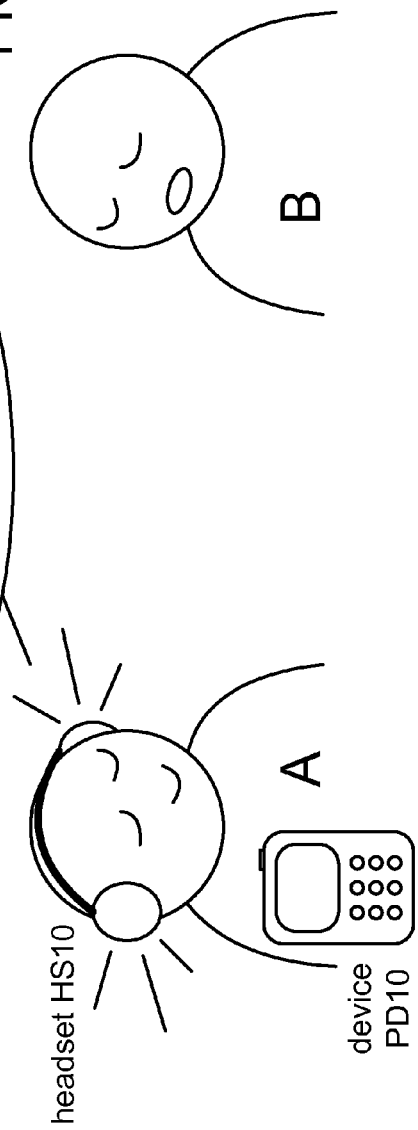

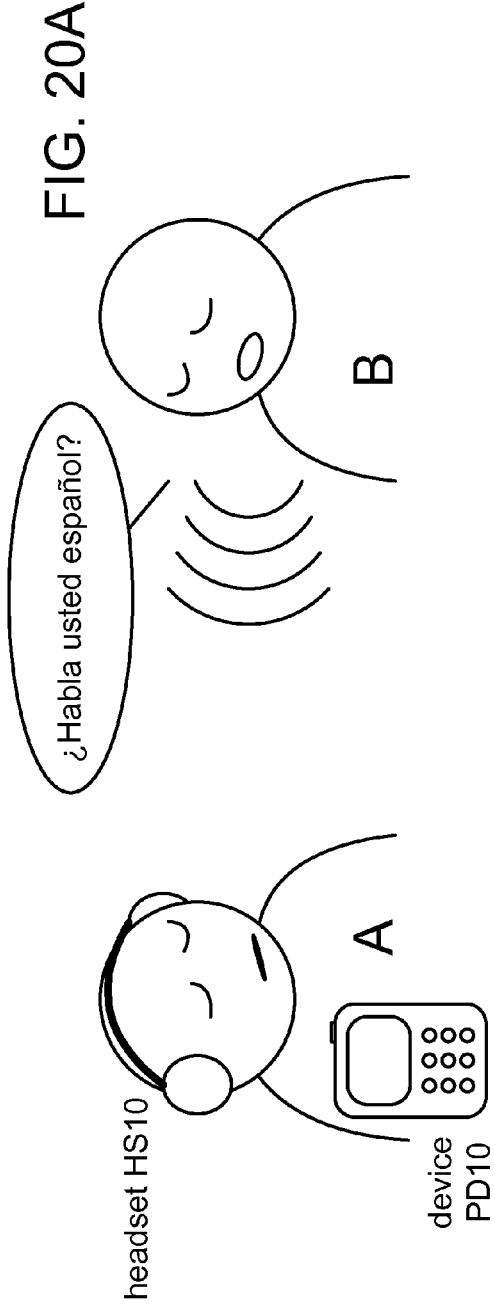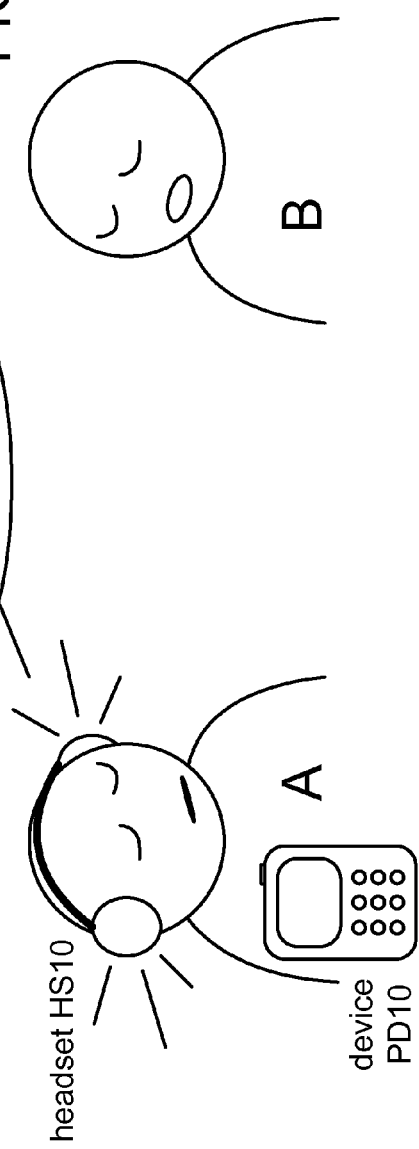

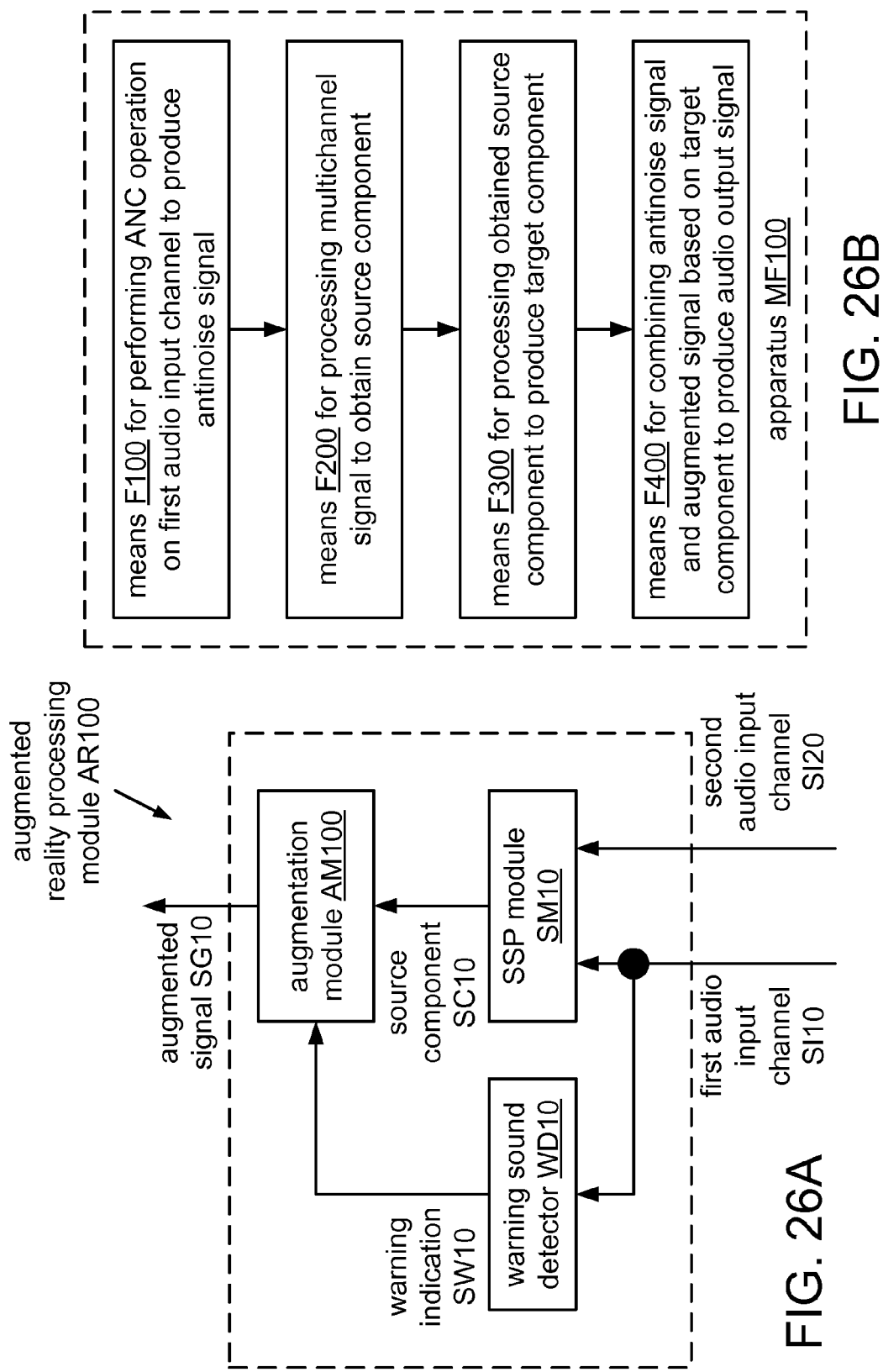

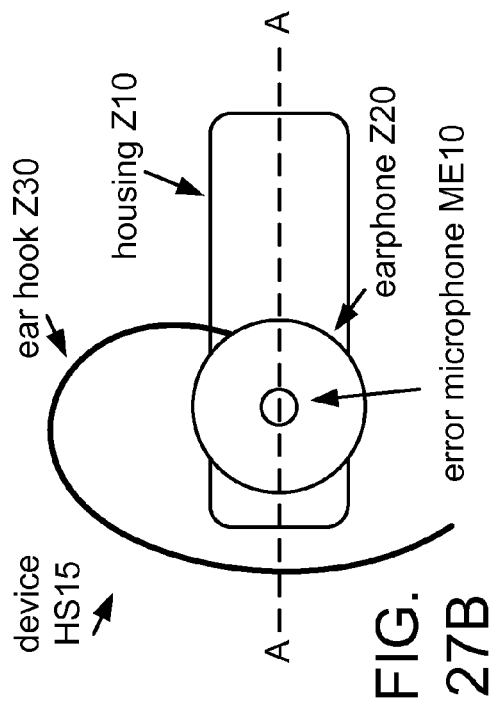
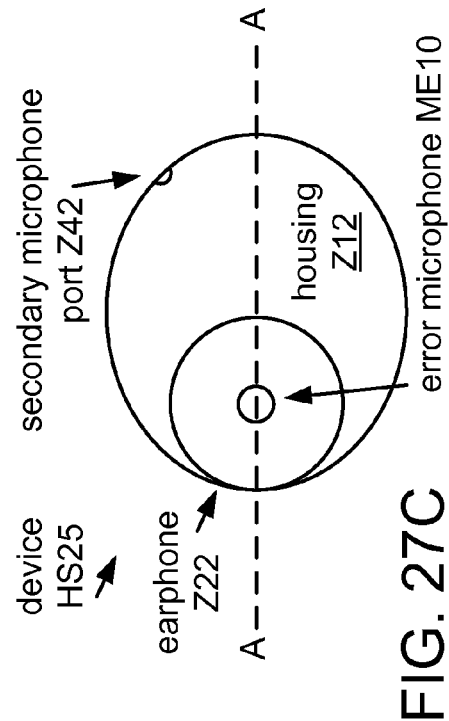
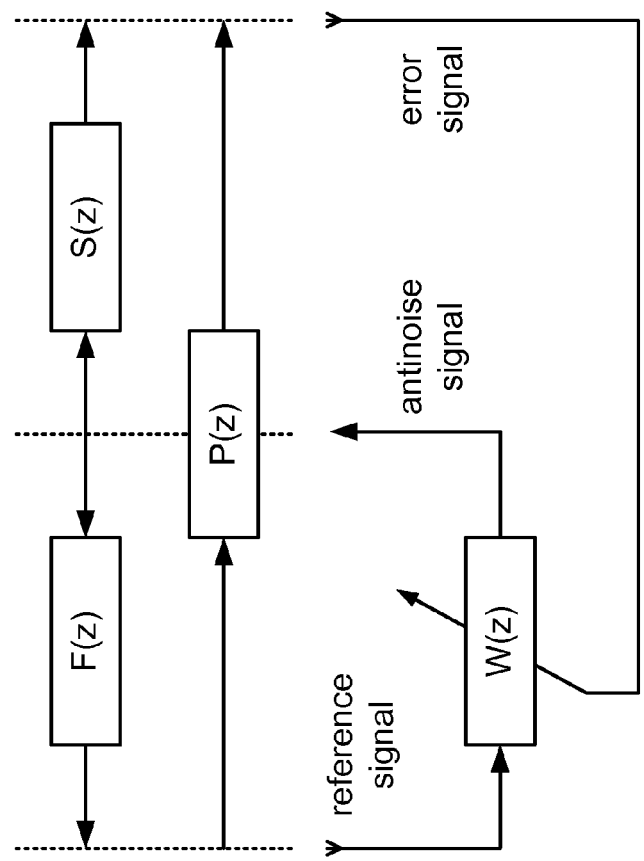
FIG. 27B
FIG. 27C
FIG. 27A

SYSTEMS, METHODS, APPARATUS, AND COMPUTER-READABLE MEDIA FOR SPATIALLY SELECTIVE AUDIO AUGMENTATION

CLAIM OF PRIORITY UNDER 35 U.S.C. §119

The present application for patent claims priority to Provisional Application No. 61/445,974, entitled "AUDIO AUGMENTED REALITY USING ANC HEADSET," filed Feb. 23, 2011, and assigned to the assignee hereof.

BACKGROUND

1. Field

This disclosure relates to audio signal processing.

2. Background

The term "augmented reality" (or AR) refers to augmentation of a perceived environment by computer-generated sensory input. By contrast, the term "virtual reality" refers to replacing the real environment with a simulated environment.

Visual augmentation of reality has been widely demonstrated. In a video application, it is relatively easy to replace an original element of the environment with a corresponding augmented element by simply applying the augmented element as an opaque overlay to cover up the original element. One example of visual augmented reality is the yellow computer-generated "first down" line that is now a common feature of football game broadcasts.

SUMMARY

A method of processing a multichannel signal according to a general configuration includes performing an active noise cancellation operation on a first audio input channel of the multichannel signal to produce an antinoise signal. This method also includes processing the multichannel signal to obtain a source component, where the processing includes performing a spatially selective processing operation on the multichannel signal to separate the source component from a background component. This method also includes processing the obtained source component to produce a target component, and combining the antinoise signal and an augmented signal that is based on the target component to produce an audio output signal. Computer-readable storage media (e.g., non-transitory media) having tangible features that cause a machine reading the features to perform such a method are also disclosed.

An apparatus for processing a multichannel signal according to a general configuration includes means for performing an active noise cancellation operation on a first audio input channel of the multichannel signal to produce an antinoise signal. This apparatus also includes means for processing the multichannel signal to obtain a source component, where the processing includes performing a spatially selective processing operation on the multichannel signal to separate the source component from a background component. This apparatus also includes means for processing the obtained source component to produce a target component, and means for combining the antinoise signal and an augmented signal that is based on the target component to produce an audio output signal.

An apparatus for processing a multichannel signal according to another general configuration includes an active noise cancellation filter configured to perform an active noise cancellation operation on a first audio input channel of the multichannel signal to produce an antinoise signal. This apparatus also includes an augmented reality processing module configured to process the multichannel signal to obtain a source component. The augmented reality processing module includes a spatially selective filter, configured to perform a spatially selective processing operation on the multichannel signal to separate the source component from a background component, and an augmentation module, configured (A) to process the obtained source component to produce a target component and (B) to output an augmented signal that is based on the target component. This apparatus also includes an audio output stage configured to combine the antinoise signal and the augmented signal to produce an audio output signal.

BRIEF DESCRIPTION OF THE DRAWINGS

FIG. 7A shows a block diagram of an apparatus A100 according to a general configuration.

FIG. 7B shows one example of a division of elements of apparatus A100 between a head-mounted ANC device and processing device PD10.

FIG. 8A shows a block diagram of an arrangement that includes an audio preprocessing stage AP10.

FIGS. 8B and 8C show block diagrams of arrangements that include an implementation AP20 of audio preprocessing stage AP10.

FIG. 9A shows a left-hand example of an earbud EB10.

FIG. 9B shows a block diagram of an implementation A200 of apparatus A100.

FIG. 10A shows a side view of a left-hand example of an earbud EB20.

FIG. 10B shows a front view of an example of an earbud EB30.

FIG. 10C shows a use case of earbuds carrying microphones ML10 and MR10.

FIG. 13A shows a block diagram of an implementation AR20 of module AR10.

FIG. 13B shows a block diagram of an implementation AM20 of augmentation module AM10.

FIG. 13C shows a block diagram of an implementation SM20 of SSP module SM10.

FIG. 14A shows an example of selecting a desired one among three spatial sectors.

FIG. 14B shows an example of selecting a desired one among five spatial sectors.

FIG. 14C shows a block diagram of an implementation A200 of apparatus A210.

FIGS. 16A and 16B show an example in which the proposed scheme is used to support a "bionic ear" application.

FIGS. 20A and 20B show an example in which the proposed scheme is used to support translation of live speech.

FIG. 26A shows a block diagram of an implementation AR100 of augmentation module AR20.

FIG. 26B shows a block diagram of an apparatus MF100 according to a general configuration.

FIG. 27A shows a block diagram of a general ANC system.

FIGS. 27B and 27C show examples of implementations HS15 and HS25 of headsets HS10 and HS20, respectively.

DETAILED DESCRIPTION

Figure 1B:
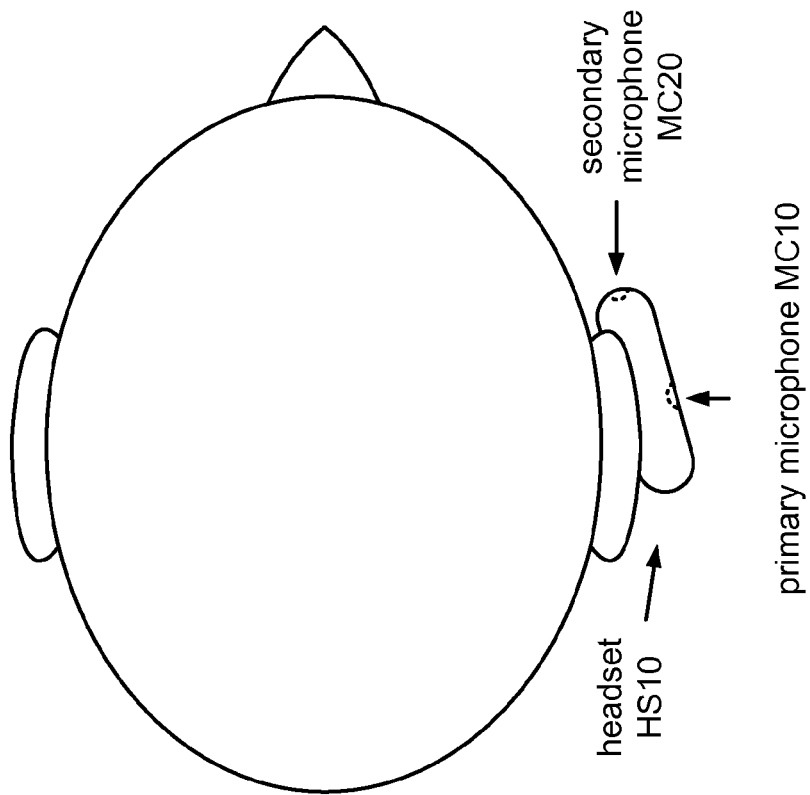
FIG. 1B shows a top view of a use of headset HS10 being worn on the right ear of a user.

Audio augmentation of reality has not been pursued because it is difficult to effectively control an audio environment. For example, an incoming sound element cannot be removed with a simple overlay like a video element, and it is difficult to selectively pass and block the arrival of natural sounds at the user's ear.

A conventional hearing aid may be used to enhance a user's ability to hear environmental sounds. While a hearing aid may amplify environmental sounds, however, it does not block them, so that such a device does not provide sufficient control for augmenting audio reality. While passive headsets have been used to block environmental sounds, their blocking capability is limited.

Active noise cancellation (ANC) headsets may be used to cancel environmental sound while listening to prerecorded media or a remote communication. Systems, methods, and apparatus described herein may be used with a multi-microphone (e.g., stereophonic) active noise cancellation (ANC) headset to provide selective control and augmentation of environmental sounds. Various use cases of audio-augmented reality and its effective implementation through ANC headsets and mobile devices are disclosed.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

It may be assumed that in the near-field and far-field regions of an emitted sound field, the wavefronts are spherical and planar, respectively. The near-field may be defined as that region of space which is less than one wavelength away from a sound receiver (e.g., a microphone array). Under this definition, the distance to the boundary of the region varies inversely with frequency. At frequencies of two hundred, seven hundred, and two thousand hertz, for example, the distance to a one-wavelength boundary is about 170, forty-nine, and seventeen centimeters, respectively. It may be useful instead to consider the near-field/far-field boundary to be at a particular distance from the microphone array (e.g., fifty centimeters from a microphone of the array or from the centroid of the array, or one meter or 1.5 meters from a microphone of the array or from the centroid of the array).

Active noise cancellation (ANC, also called active noise reduction) is a technology that actively reduces acoustic noise in the air by generating a waveform that is an inverse form of the noise wave (e.g., having the same level and an inverted phase), also called an "antiphase" or "anti-noise" waveform. An ANC system generally uses one or more microphones to pick up an external noise reference signal, generates an anti-noise waveform from the noise reference signal, and reproduces the anti-noise waveform through one or more loudspeakers. This anti-noise waveform interferes destructively with the original noise wave to reduce the level of the noise that reaches the ear of the user.

An ANC headset may be used as described herein as an effective mechanism to control the passage of environmental sounds into the user's ear and to improve an environmental listening capability of the user. Use of an ANC headset in the proposed scheme may provide a more effective replacement of a real audio signal with virtual audio than is available with conventional augmented reality techniques.

An ANC headset typically includes one or more reference microphones that are positioned close to the user's ear to capture environmental sounds. Such a microphone or microphones are also advantageously located for capturing audio signals for augmented reality applications and may be used to provide selective capture and processing of environmental sounds for spatial-diversity-based selective signal processing and augmentation.

Figure 1A:
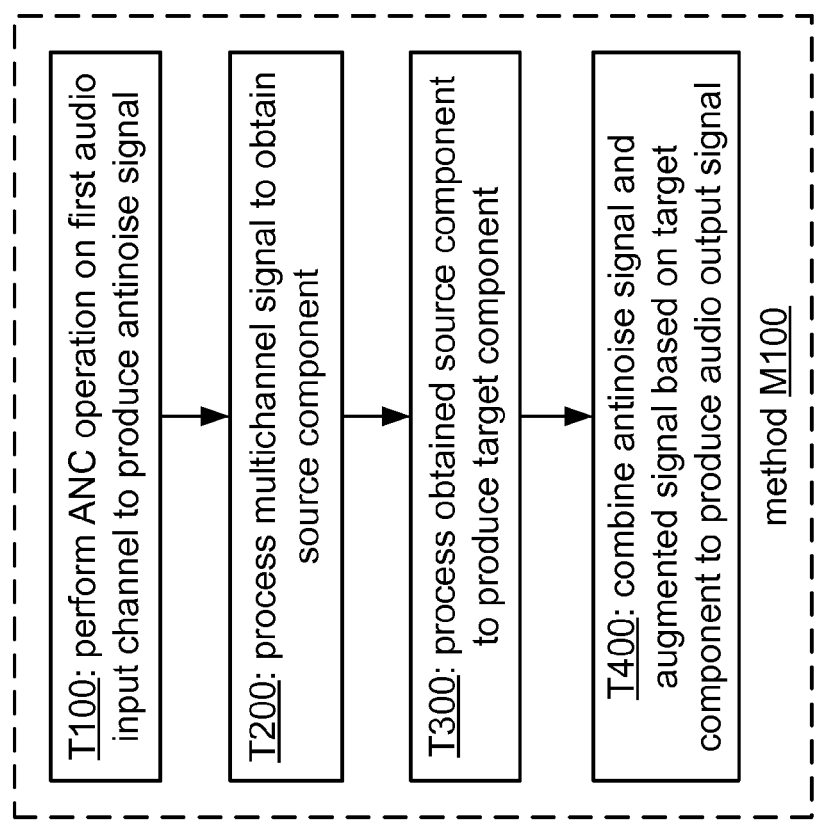
FIG. 1A shows a flowchart of a method M100 according to a general configuration.

FIG. 1A shows a flowchart of a method M100 of processing a multichannel signal according to a general configuration that includes tasks T100, T200, T300, and T400. Task T100 performs an ANC operation on a first audio input channel of the multichannel signal to produce an antinoise signal. Task T200 processes the multichannel signal, which includes the first audio input channel and a second audio input channel, to obtain a source component of the multichannel signal. Task T200 includes performing a spatially selective processing (SSP) operation on the multichannel signal to separate the source component from a background component of the multichannel signal. Task T300 processes the obtained source component to produce a target component. Task T300 typically includes increasing a perceptibility of the obtained source component. Task T400 combines the antinoise signal and an augmented signal that is based on the target component to produce an audio output signal.

An earpiece or other headset having two or more microphones is one kind of portable audio sensing device (e.g., a communications device) that may be configured to perform an implementation of method M100. Such a headset may be wired or wireless. For example, a wireless headset may be configured to support half- or full-duplex telephony via communication with a telephone device such as a cellular telephone handset (e.g., using a version of the Bluetooth™ protocol as promulgated by the Bluetooth Special Interest Group, Inc., Bellevue, Wash.).

Figure 2B:
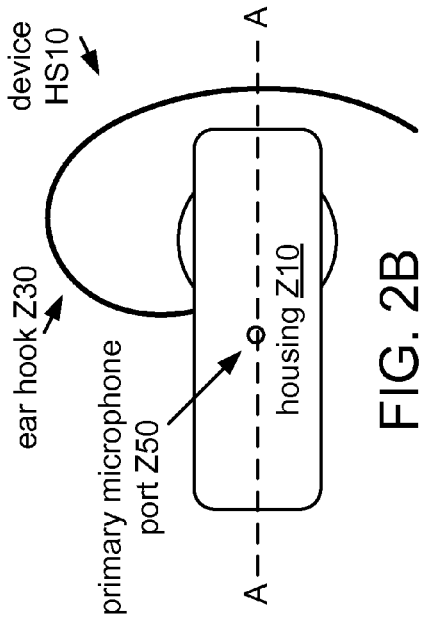
FIGS. 2A to 2D show various views of a wireless headset HS10.
Figure 2D:
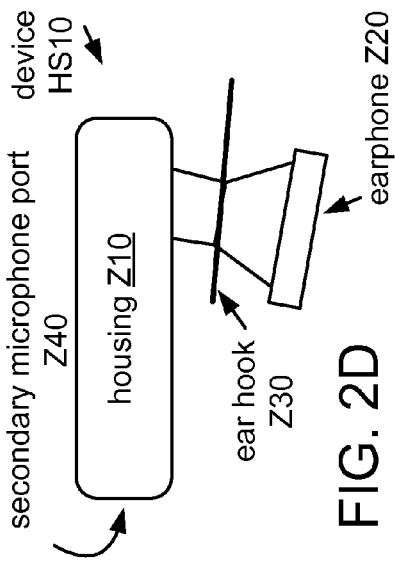
Figure 2A:
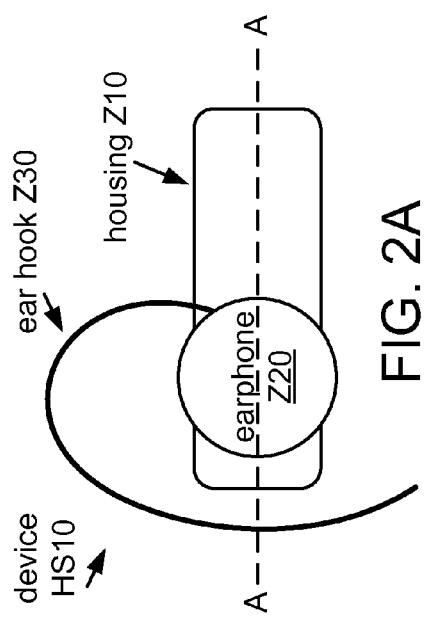

FIGS. 2A to 2D show various views of a wireless headset HS10 that may be configured to perform an implementation of method M100. Headset HS10 includes a housing Z10 which carries a two-microphone array and an earphone Z20 that extends from the housing. In general, the housing of a headset may be rectangular or otherwise elongated as shown in FIGS. 2A, 2B, and 2D (e.g., shaped like a miniboom) or may be more rounded or even circular. The housing may also enclose a battery and a processor and/or other processing circuitry (e.g., a printed circuit board and components mounted thereon) and may include an electrical port (e.g., a mini-Universal Serial Bus (USB) or other port for battery charging) and user interface features such as one or more button switches and/or LEDs. Typically the length of the housing along its major axis is in the range of from one to three inches.

Figure 2C:
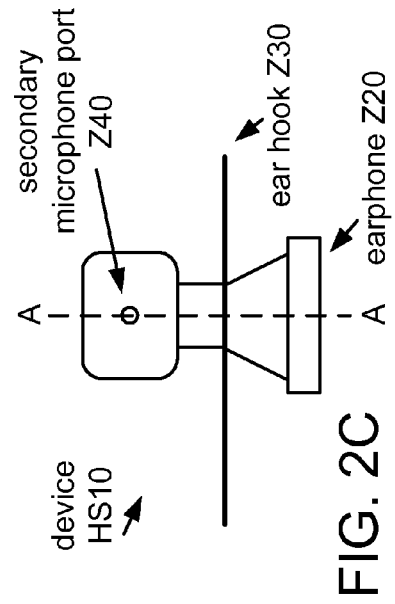
Figure 3B:
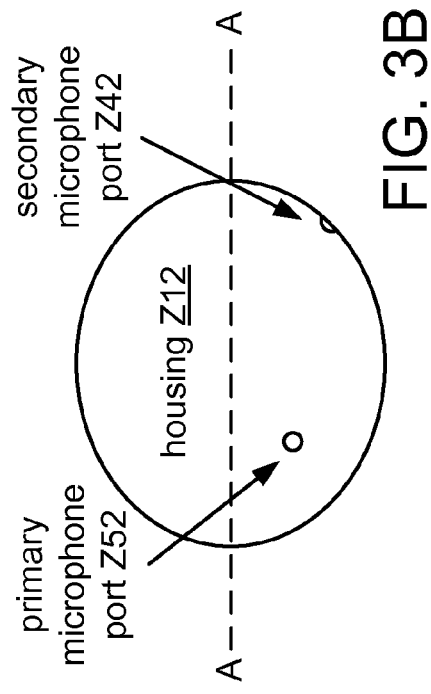
FIGS. 3A to 3D show various views of a multi-microphone portable audio sensing device HS20.
Figure 3D:
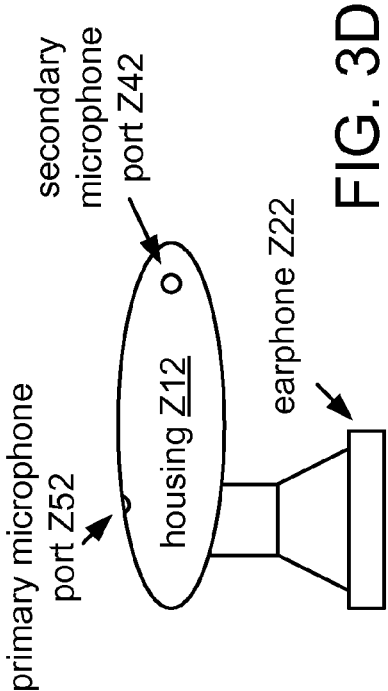
Figure 3A:
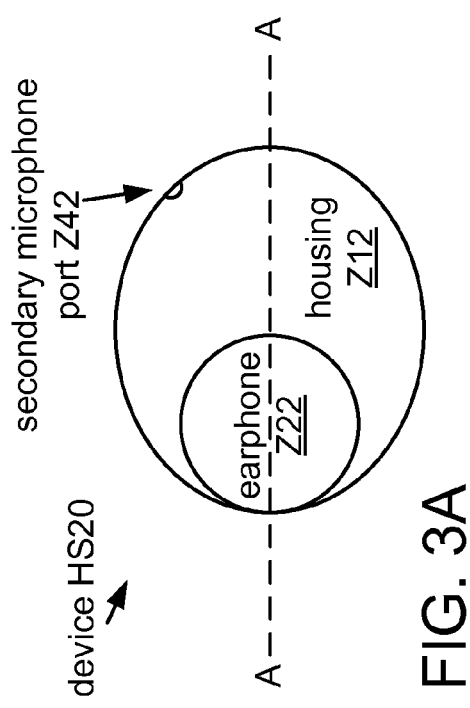
Figure 3C:
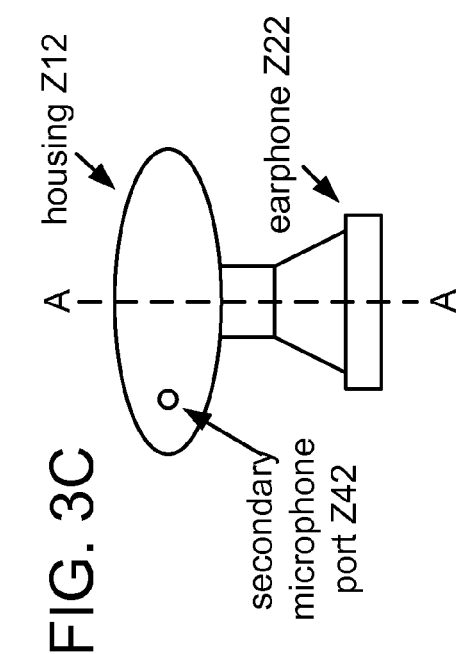
Figure 4C:
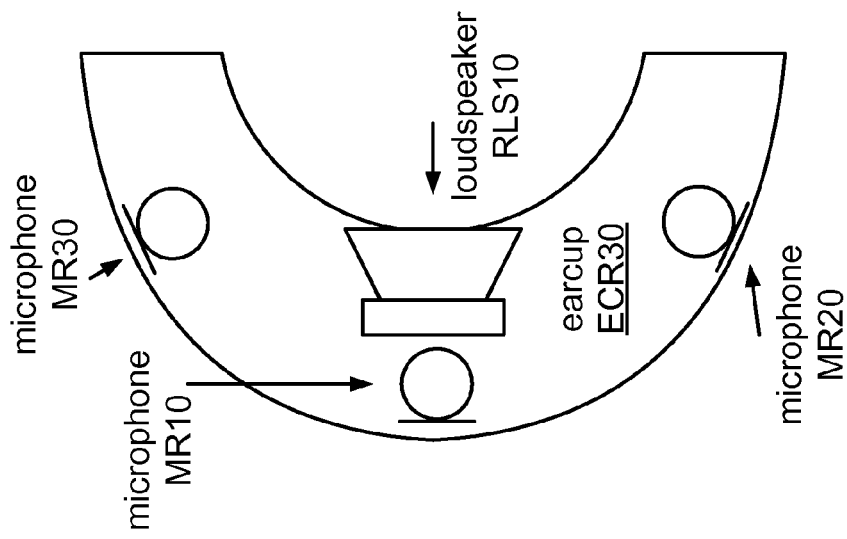
FIGS. 4A to 5C show horizontal cross-sections of right-side implementations ECR10, ECR20, ECR30, ECR40, ECR50 and ECR60, respectively, of earcups.
Figure 4B:
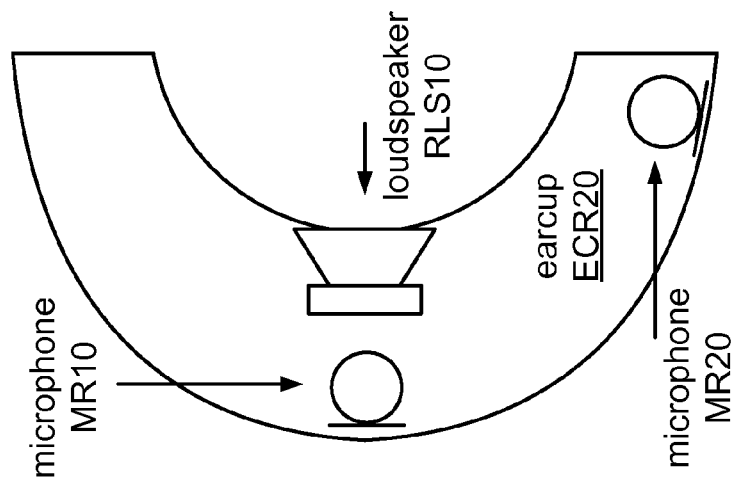
Figure 4A:
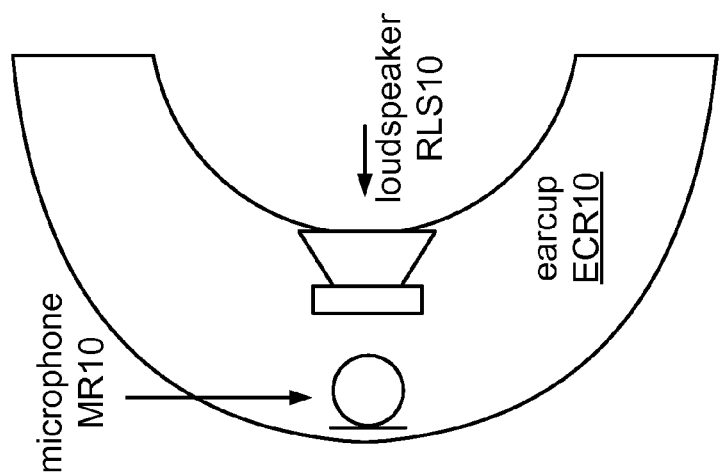
Figure 5C:
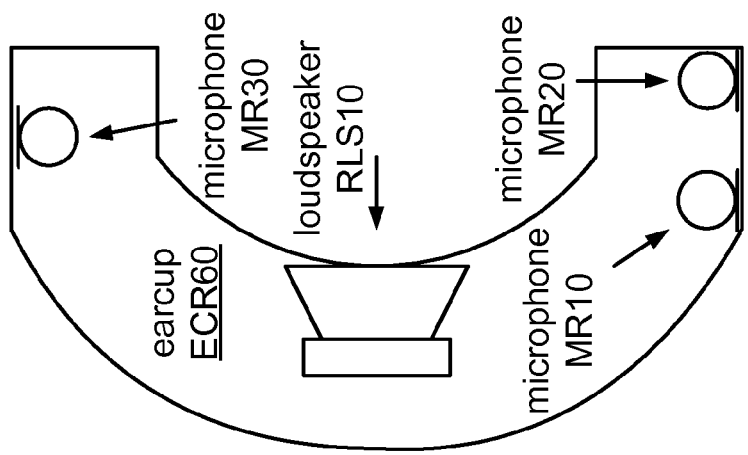
Figure 5B:
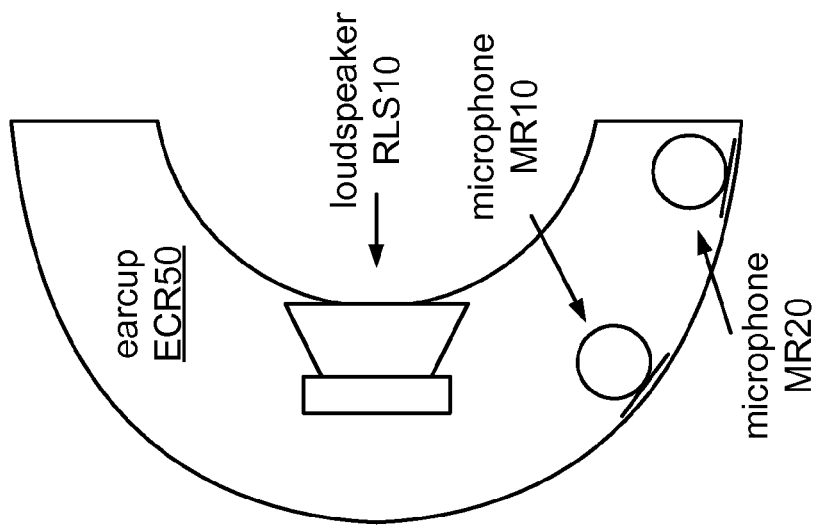
Figure 5A:
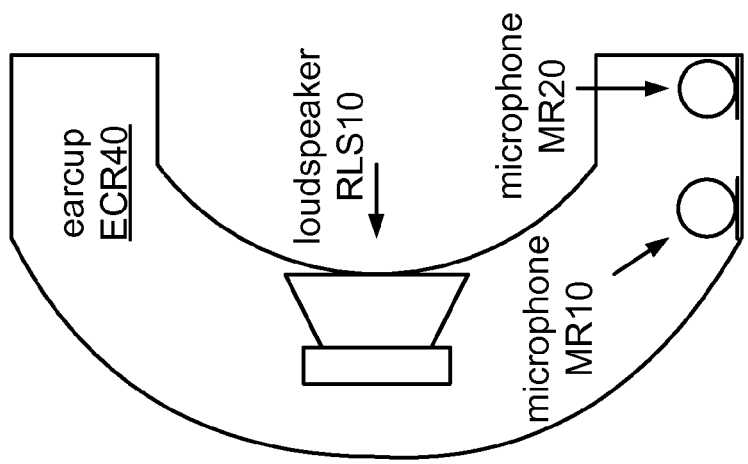

In such an implementation of method M100, the first audio input channel is based on a signal produced by a primary microphone of the headset, and the first audio input channel is based on a signal produced by a secondary microphone of the headset. Typically each microphone is mounted within the headset behind one or more small holes in the housing that serve as an acoustic port. FIGS. 2B to 2D show the locations of the acoustic port Z50 for a primary microphone of device HS10 and the acoustic port Z40 for a secondary microphone of device HS10. Earphone Z20 directs sound from a loudspeaker of the headset, which produces an acoustic signal that is based on the audio output signal, into an ear canal of the user.

A headset may also include a securing device, such as ear hook Z30, which is typically detachable from the headset. An external ear hook may be reversible, for example, to allow the user to configure the headset for use on either ear. Alternatively, the earphone of a headset may be designed as an internal securing device (e.g., an earplug) which may include a removable earpiece to allow different users to use an earpiece of different size (e.g., diameter) for better fit to the outer portion of the particular user's ear canal. FIG. 1B shows a top view of a use of headset HS10 being worn on the right ear of a user.

FIGS. 3A to 3D show various views of a multi-microphone portable audio sensing device HS20 that is another example of a wireless headset which may be configured to perform an implementation of method M100. Device HS20 includes a rounded, elliptical housing Z12 and an earphone Z22 that may be configured as an earplug. FIGS. 3A to 3D also show the locations of the acoustic port Z52 for the primary microphone and the acoustic port Z42 for the secondary microphone of device H520. It is possible that primary microphone port Z52 may be at least partially occluded (e.g., by a user interface button).

An earcup having two or more microphones, or a pair of earcups (which are typically joined by a band to be worn over the user's head) each having at least one microphone, is another kind of portable communications device that may be configured to perform an implementation of method M100. FIGS. 4A to 5C show horizontal cross-sections of right-side implementations ECR10, ECR20, ECR30, ECR40, ECR50 and ECR60, respectively, of such earcups (also called headphones) that include a loudspeaker RLS10 that is arranged to produce an acoustic signal based on the audio output signal to the user's ear. Such earcups may be configured to be supraaural (i.e., to rest over the user's ear during use without enclosing it) or circumaural (i.e., to enclose the user's ear during use). These examples also include one or more microphones MR10, MR20, MR30 that are arranged to receive environmental acoustic signals via an acoustic port in the earcup housing and to produce signals on which the corresponding input audio signals are based. It may be desirable to insulate the microphones from receiving mechanical vibrations from loudspeaker RLS10 through the structure of the earcup.

Figure 6B:
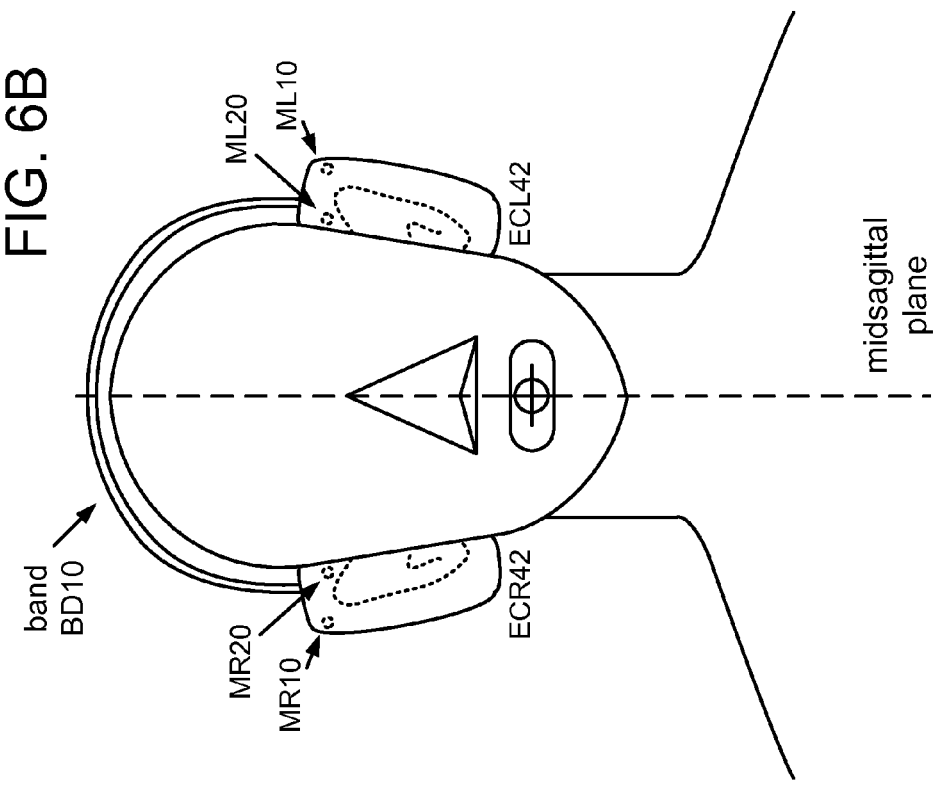
FIGS. 6A and 6B show top and front views, respectively, of a typical use case of a pair of headphones.
Figure 6A:
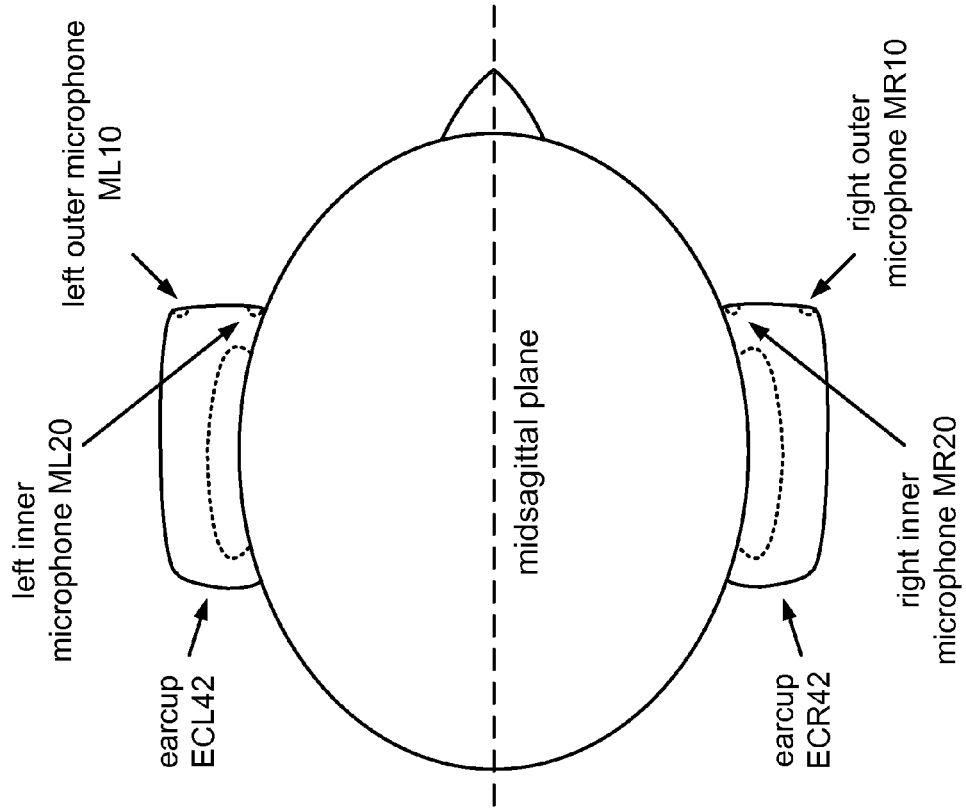

It will be understood that left-side instances of the various right-side earcups described herein are configured analogously. FIGS. 6A and 6B show top and front views, respectively, of a typical use case of a pair of headphones. This example includes an implementation ECR42 of earcup ECR40, a corresponding left-side earcup ECL42, and a band BD10 that joins the two earcups.

FIG. 7A shows a block diagram of an apparatus A100 according to a general configuration that includes an ANC filter AF10, an augmented reality (AR) processing module AR10, and an audio output stage AO10. Apparatus A100 may be used to perform an implementation of method M100. For example, ANC filter AF10 may be used to perform task T100, AR processing module AR10 may be used to perform tasks T200 and T300, and audio output stage AO10 may be used to perform task T400.

During the operation of a multi-microphone audio sensing device as described herein, the array of two or more microphones produces a multichannel signal in which each channel is based on the response of a corresponding one of the microphones to the acoustic environment. One microphone may receive a particular sound more directly than another microphone, such that the corresponding channels differ from one another to provide collectively a more complete representation of the acoustic environment than can be captured using a single microphone.

It may be desirable for the audio sensing device to perform one or more processing operations on the signals produced by the microphones to produce the corresponding multichannel signal. For example, such a device may include an arrangement as shown in FIG. 8A that includes an audio preprocessing stage AP10. Audio preprocessing stage AP10 is configured to perform one or more such operations, which may include (without limitation) impedance matching, analog-to-digital conversion, gain control, and/or filtering in the analog and/or digital domains, on the signals produced by the microphones to produce the multichannel signal MCS10 such that each channel SI10 and SI20 is based on a response of the corresponding microphone to an acoustic signal.

FIG. 8B shows a block diagram of such an arrangement that includes an implementation AP20 of audio preprocessing stage AP10 which includes analog preprocessing stages P10$a$ and P10$b$. In one example, stages P10$a$ and P10$b$ are each configured to perform a highpass filtering operation (e.g., with a cutoff frequency of 50, 100, or 200 Hz) on the corresponding signals from microphones MR10 and MR20.

It may be desirable for the preprocessing stage to produce the corresponding multichannel signal as a digital signal, that is to say, as a sequence of samples. For example, audio preprocessing stage AP20 includes analog-to-digital converters (ADCs) C10$a$ and C10$b$ that are each arranged to sample the corresponding analog channel. Typical sampling rates for acoustic applications include 8 kHz, 12 kHz, 16 kHz, and other frequencies in the range of from about 8 to about 16 kHz, although sampling rates as high as about 32, 44.1, 48, or 192 kHz may also be used. In this particular example, audio preprocessing stage AP20 also includes digital preprocessing stages P20$a$ and P20$b$ that are each configured to perform one or more preprocessing operations (e.g., echo cancellation, noise reduction, and/or spectral shaping) on the corresponding digitized channel to produce the corresponding channels SI10, SI20 of multichannel signal MCS10. FIG. 8C shows an example in which audio preprocessing stage AP20 is arranged to produce audio input channels SI10 and SI20 based on signals produced by corresponding microphones ML10 and MR10.

For a case in which the ANC device is large enough (e.g., a headphone), apparatus A100 may be implemented within the device. In other cases, it may be desirable to implement some elements of apparatus A100 within the head-mounted ANC device, and other elements of apparatus A100 within a portable processing device PD10. Examples of such a processing device include, without limitation, a cellular telephone handset, smartphone, or other mobile communications device; a personal digital assistant (PDA) or other handheld computing device; and a notebook computer, laptop computer, netbook computer, tablet computer, or other portable computing device. FIG. 7B shows one example of such a division of elements of apparatus A100 between the head-mounted ANC device (e.g., a headset, earcup, or earbud as described herein) and processing device PD10. In this example, portion A102A of apparatus A100 (i.e., ANC filter AF10 and audio output stage AO10) is implemented within the ANC device, and portion A102B of apparatus A100 (i.e., AR processing module AR10) is implemented within PD10. In this and other implementations of apparatus A100, AR processing module AR10 is typically implemented in a digital domain, while ANC filter AF10 may be implemented to perform ANC filtering in the analog domain or in a digital domain, and likewise audio output stage AO10 may be implemented to combine signals SG10 and SA10 to produce output signal SO10 in the analog domain or in a digital domain.

Communication of channels SI10 and SI20 and signal SG10 between portable processing device PD10 and the ANC device may occur over a wired and/or wireless transmission channel. Examples of wireless methods that may be used to support such a communications link include low-power radio specifications for short-range communications (e.g., from a few inches to a few feet) such as Bluetooth (e.g., a Headset or other Profile as described in the Bluetooth Core Specification version 4.0 [which includes Classic Bluetooth, Bluetooth high speed, and Bluetooth low energy protocols], Bluetooth SIG, Inc., Kirkland, Wash.), Peanut (QUALCOMM Incorporated, San Diego, Calif.), and ZigBee (e.g., as described in the ZigBee 2007 Specification and/or the ZigBee RF4CE Specification, ZigBee Alliance, San Ramon, Calif.). Other wireless transmission channels that may be used between such devices include non-radio channels such as infrared and ultrasonic.

In another example, the microphones and loudspeaker are implemented within one or more earbuds. FIG. 9A shows a left-hand example of an earbud EB10 that includes a loudspeaker LLS10 and microphones ML10 and ML20 in a corded implementation. In this example, microphone ML20 is mounted on a semi-rigid cable portion CB10 of cord CD10 at a distance of about three to four centimeters from microphone ML10. Semi-rigid cable CB10 may be configured to be flexible and lightweight yet stiff enough to keep microphone ML20 oriented in a relatively constant direction (e.g., relative to microphone ML10) during use. FIG. 10A shows a side view of a left-hand example of another earbud EB20 in which microphone ML20 is mounted within a strain-relief portion of cord CD20 at the earbud such that microphone ML20 is oriented in a relatively constant forward direction (e.g., relative to microphone ML10) during use.

In another example, microphones ML10 and MR10 are implemented within respective ones of a pair of earbuds. FIG. 10B shows a front view of an example of an earbud EB30 that contains left loudspeaker LLS10 and left microphone ML10. During use, earbud EB30 is worn at the user's left ear to direct an acoustic signal produced by left loudspeaker LLS10 (e.g., from an instance of audio output signal SO10 received via cord CD30) into the user's ear canal. It may be desirable for a portion of the earbud (e.g., EB10, EB20, EB30) which directs the acoustic signal into the user's ear canal to be made of or covered by a resilient material, such as an elastomer (e.g., silicone rubber), such that it may be comfortably worn to form a seal with the user's ear canal.

For a case in which the augmented reality application passes a signal through to the user's ear, an ANC headset may also deliver most high-fidelity sounds (e.g., in terms of binaural cue). FIG. 9B shows a block diagram of an implementation A200 of apparatus A100 that includes a second ANC filter AF20 and a second audio output stage A020. A second instance AF20 of ANC filter AF10 is configured to produce a second antinoise signal SA20 that is based on second audio input channel SI20, and a second instance A020 of audio output stage AO10 is configured to combine augmented signal SG10 with antinoise signal SA20 to produce a second audio output signal SO20.

A device that includes apparatus A200 is typically configured to include a microphone and a loudspeaker worn at one of the user's ears (e.g., within a headset, earcup, or earbud as described herein) to provide first audio input signal SI10 and to be driven by audio output signal SO10, respectively, and another microphone and loudspeaker worn at the other of the user's ears (e.g., within a another headset, earcup, or earbud as described herein) to provide second audio input signal SI20 and to be driven by audio output signal SO20, respectively. For example, apparatus A200 may be implemented within one or both of a pair of headsets, earcups (e.g., headphones), or earbuds as described herein and/or within an instance of portable processing device PD10. For a case in which apparatus A200 is implemented with a pair of wireless headsets, such headsets may be configured to transfer the respective audio input and output signals with device PD10 and/or with each other using any of the wireless channels described herein.

Figure 11:
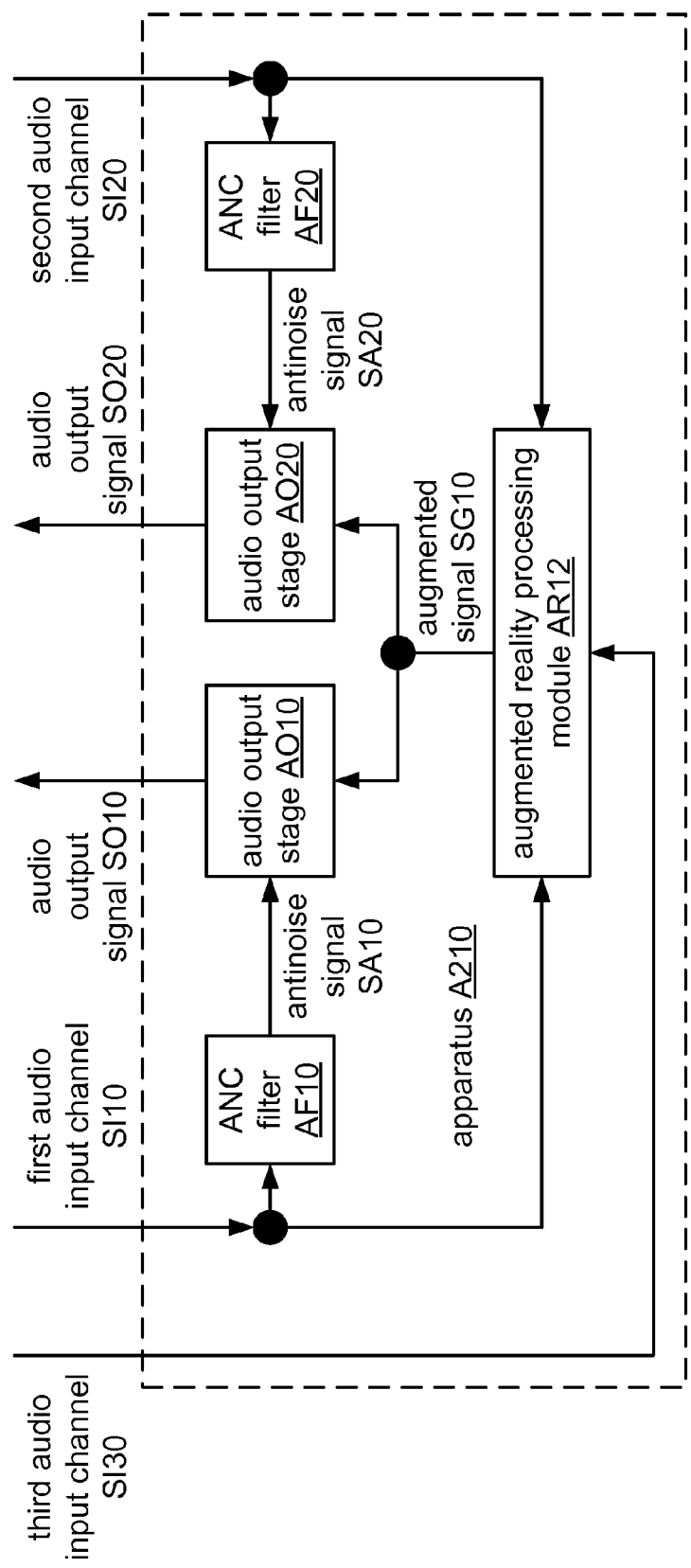
FIG. 11 shows a block diagram of an implementation A210 of apparatus A200.

Apparatus A100 is implemented to receive audio input signals from at least two microphones, but better performance (e.g., increased directional selectivity) may be expected if more than two microphones are used. FIG. 11 shows a block diagram of an implementation A210 of apparatus A200 that includes an implementation AR12 of AR processing module AR10. In this example, module AR12 is configured to perform a spatially selective processing operation on audio input channels SI10, SI20, and SI30 to separate the source component from a background component. Audio input channel SI30 may be based on a signal produced by an additional microphone ML20, MR20, or MC10 as described herein with reference to various examples of head-mounted microphone placements. It will be understood that AR processing module AR10 may be similarly extended in such manner to process four, five, or an arbitrarily larger number of audio input channels.

FIG. 10C shows a use case in which earbuds carrying microphones ML10, MR10 and corresponding left and right loudspeakers (not shown) are implemented to transfer the audio input signals SI10, SI20, SI30 to, and the audio output signals SO10, SO20 from, an implementation of portable processing device PD10 as a portable media player PD20 over a cord CD40. In this case, the third audio input signal SI30 is based on a signal produced by cord-mounted microphone ML20.

Figure 12A:
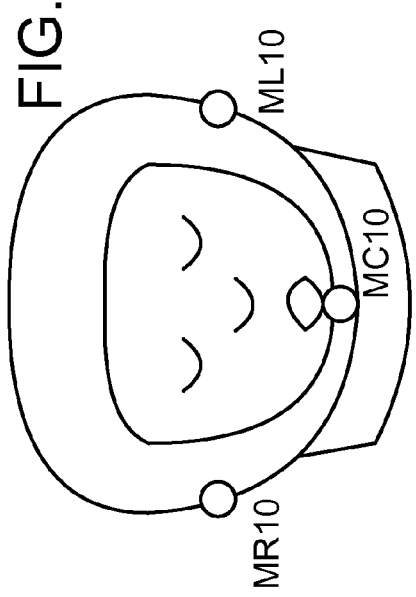
FIGS. 12A-12E show additional examples of devices that may be used to carry microphones and/or a loudspeaker as described herein.
Figure 12B:
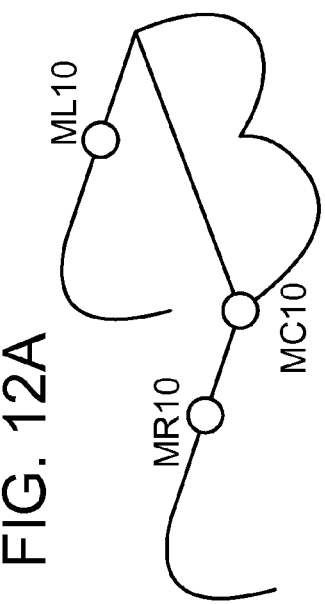
Figure 12C:
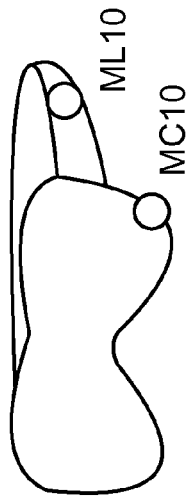
Figure 12D:
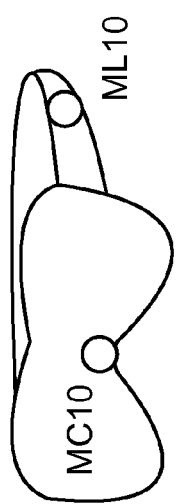
Figure 12E:
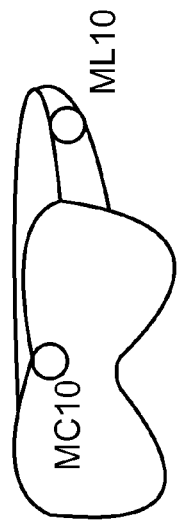

FIGS. 12A-12E show additional examples of devices that may be used to carry microphones and/or a loudspeaker as described herein. FIG. 12A shows eyeglasses (e.g., prescription glasses, sunglasses, or safety glasses) having each microphone of binaural pair ML10, MR10 mounted on a temple and another microphone MR20 mounted on a temple or the corresponding end piece. FIG. 12B shows a helmet in which microphone MC10 is mounted at the front of the user's face (e.g., at the user's mouth) and each microphone of binaural pair ML10, MR10 is mounted at a corresponding side of the user's head. FIGS. 12C-E show examples of goggles (e.g., ski goggles) in which each microphone of binaural pair ML10, MR10 is mounted at a corresponding side of the user's head, with each of these examples showing a different corresponding location for additional microphone MC10. Additional examples of placements for microphones for use with an implementation of apparatus A100 as described herein include but are not limited to the following: visor or brim of a cap or hat; lapel, breast pocket, or shoulder.

Active noise cancellation filter AF10 is configured to receive a first input audio channel SI10 and to perform an active noise cancellation operation to produce a corresponding antinoise signal SA10. It is typically desirable to configure ANC filter AF10 to generate antinoise signal SA10 to be matched with the acoustic noise in amplitude and opposite to the acoustic noise in phase. Filter AF10 may also perform signal processing operations (e.g., time delay matching or minimization, gain amplification, and/or frequency response equalization) to achieve optimal noise cancellation. It may be desirable to configure ANC filter AF10 to high-pass filter the signal (e.g., to attenuate high-amplitude, low-frequency acoustic signals). Additionally or alternatively, it may be desirable to configure ANC filter AF10 to low-pass filter the signal (e.g., such that the ANC effect diminishes with frequency at high frequencies). Because antinoise signal SA10 should be available by the time the acoustic noise travels from the microphone to the loudspeaker, the processing delay caused by ANC filter AF10 should not exceed a very short time (typically about thirty to sixty microseconds).

Filter AF10 may be configured to perform the ANC operation in the analog domain and/or in a digital domain, and in the time domain and/or in a transform domain (e.g., a Fourier transform or other frequency domain). Examples of ANC operations that may be performed by ANC filter AF10 to produce antinoise signal SA10 include a phase-inverting filtering operation, a least mean squares (LMS) filtering operation (e.g., filtered-reference ("filtered-x") LMS, as described in U.S. Pat. Appl. Publ. No. 2006/0069566 (Nadjar et al.) and elsewhere), and a digital virtual earth algorithm (e.g., as described in U.S. Pat. No. 5,105,377 (Ziegler)). Other examples of LMS filtering operations that may be performed by ANC filter AF10 include filtered-error ("filtered-E") LMS, filtered-U LMS, and other variants (e.g., subband LMS, step-size-normalized LMS, etc.).

To obtain a very low latency (e.g., on the order of ten microseconds) in a digital domain, it may be desirable to implement ANC filter AF10 to perform the ANC filtering in a pulse density modulation (PDM) domain, and to adapt the coefficients of this PDM filter using an algorithm that executes in a pulse-code modulation (PCM) domain. In such case, the PDM domain has a low resolution (e.g., a bit width of one, two, or four bits) and a very high sampling rate (e.g., on the order of 100 kHz, 1 MHz, or even 10 MHz), and the PCM domain has a higher resolution (e.g., a bit width of eight, ten, twelve, or sixteen bits or more) and a lower clock rate (e.g., on the order of one or ten kHz, such as eight, 12, 16, 32, 44.1, or 48 kHz). The PDM filtering may be performed by digital hardware, such as a field-programmable gate array (FPGA), application-specific integrated circuit (ASIC), or application-specific standard product (ASSP). The PCM adaptation may be performed using an implementation of an adaptive ANC algorithm in a PCM domain using software (e.g., instructions for execution by a processor, such as a DSP). Examples of such an implementation of ANC filter AF10 are described in, for example, U.S. Publ. Pat. Appl. No. 2011/0007907, entitled "SYSTEMS, METHODS, APPARATUS, AND COMPUTER-READABLE MEDIA FOR ADAPTIVE ACTIVE NOISE CANCELLATION," published Jan. 13, 2011. (It is noted that ANC filter AF20 may be similarly implemented as a second instance of ANC filter AF10 as described herein.)

Augmented reality processing module AR10 is configured to process a multichannel signal that includes first audio input channel SI10 and second audio input channel SI10 and to produce augmented signal SG10. FIG. 13A shows a block diagram of an implementation AR20 of module AR10 that includes a spatially selective processing (SSP) module SM10 and an augmentation module AM10.

Spatially selective processing (SSP) module SM10 is configured to include a SSP filter configured to perform an SSP operation on the multichannel signal to separate a source component SC10 of the multichannel signal from a background component. Such an SSP operation may be based on, for example, phase differences and/or gain differences between the audio input channels. Sounds from nearby sources that are near an axis of the microphone array, for example, may be distinguished from a background component (e.g., sounds from distant sources and diffuse sounds) based on gain difference. In one example, the SSP filter is implemented to separate the source component based on proximity such that frames having a gain difference between the channels that meets (alternatively, that exceeds) a threshold value are separated from other frames. In such case, the gain of a frame for each channel may be calculated in the time domain as the total energy (e.g., sum of squared samples) or average energy per sample, or in the frequency domain based on, e.g., a sum of squared magnitudes.

Figure 15:
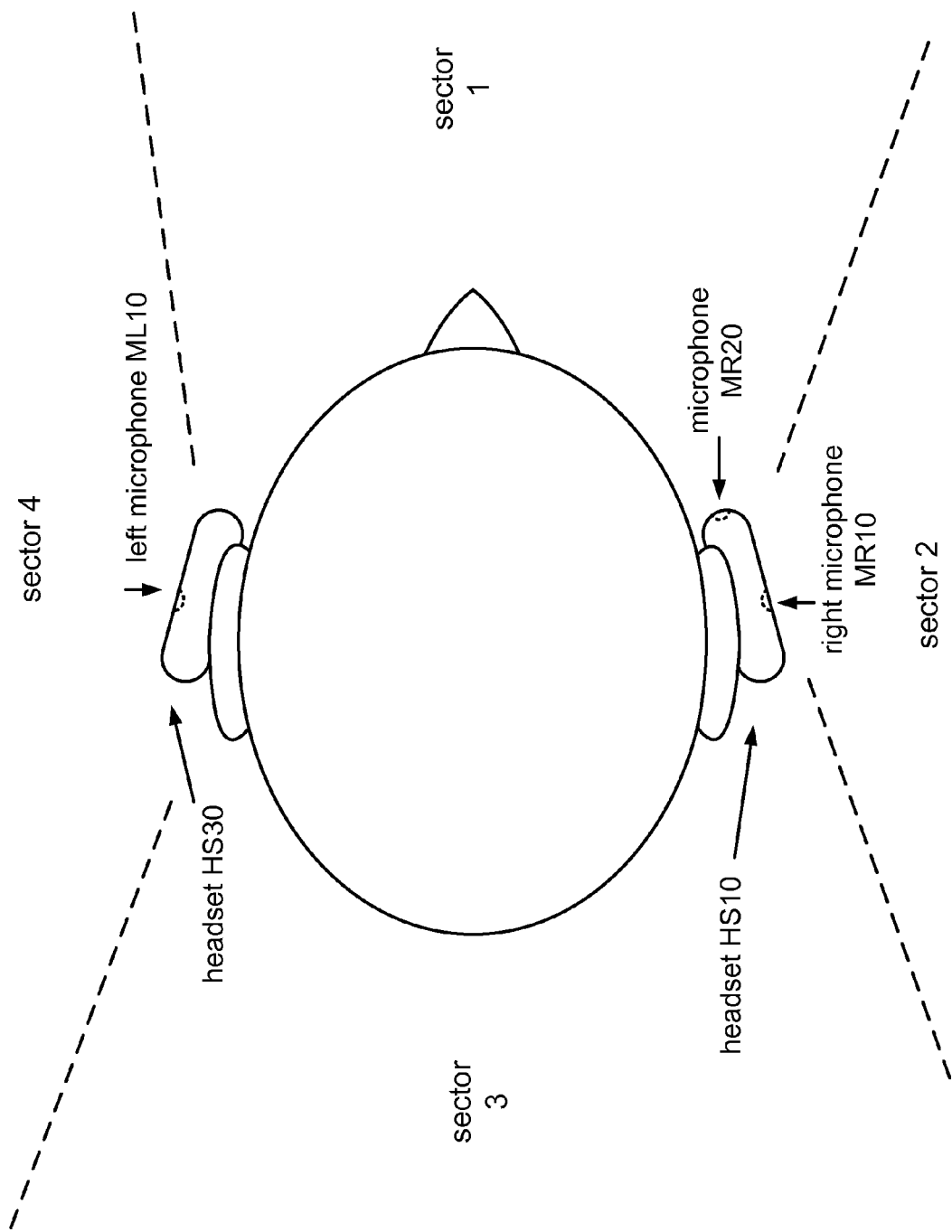
FIG. 15 shows a top view of an example of multiple selectable spatial sectors.

A gain difference between channels may also be used to separate signals that arrive from a desired range of directions (i.e., relative to an axis of the microphone array) from a background component (e.g., sounds that arrive from other directions). FIG. 14A shows an example in which the SSP filter uses the state of a relation between the gain difference GD[n] for frame n of the multichannel signal and a gain-difference threshold value $T_L$ to separate signals arriving from a desired one among three spatial sectors (i.e., endfire sector 1, broadside sector 2, and endfire sector 3) from other signals. FIG. 14B shows an example in which the SSP filter uses the state of a relation between the gain difference GD[n] and a first gain-difference threshold value $T_{L1}$, and the state of a relation between gain difference GD[n] and a second gain-difference threshold value $T_{L2}$, to select signals arriving from a desired one among five spatial sectors. FIG. 15 shows a top view of another example of multiple selectable spatial sectors in an implementation that includes wireless headset HS10 and a single-microphone headset HS30.

A phase difference between channels may also be used to separate signals that arrive from a desired range of directions from a background component (e.g., sounds that arrive from other directions). In such case, it may be desirable to configure the SSP filter to produce the spatially separated source component from one or more of the audio input channels by passing only those frequency bins whose phase difference in the multichannel signal indicates a direction of arrival that is within the desired range.

The "directional coherence" of a multichannel signal is defined as the degree to which the various frequency components of the signal arrive from the same direction. For an ideally directionally coherent channel pair, the value of the ratio of phase difference to frequency is equal to a constant k for all frequencies, where the value of k is related to the direction of arrival θ and the time delay of arrival τ. In another example, the SSP filter is configured to pass frames that are sufficiently directionally coherent within the desired range of directions.

Other examples of directionally selective SSP operations that may be performed by an SSP filter within SSP module SM10 include beamforming and blind source separation (BSS). Examples of beamforming approaches that may be used to generate one or more filters to select components in corresponding directions include generalized sidelobe cancellation (GSC), minimum variance distortionless response (MVDR), and linearly constrained minimum variance (LCMV) beamformers. Examples of BSS methods include independent component analysis (ICA) and independent vector analysis (IVA), which operate by steering null beams toward interfering point sources.

The SSP filter may be configured to apply the spatially selective processing operation in a fixed direction (for example, to separate signals that arrive from a forward direction of the user from a background component that includes signals arriving from other directions). Alternatively, a desired direction of arrival may be selected or otherwise indicated by the user via, e.g., a user interface of device PD10 (for example, a touchscreen display). In such case, it may be desirable for the head-mounted portion of the device to include one or more magnetometers, gyroscopes, and/or accelerometers configured to track a rotation of the user's head, such that the SSP filter may be implemented to adapt to maintain the selected direction (relative to a fixed external reference, such as the earth's gravitational and/or magnetic field) as the user's head rotates. Such adaptation may include selecting a different spatial sector by, for example, selecting a different gain-difference threshold relation, selecting a different ratio of phase-difference to frequency, or selecting a different one of a set of beamforming filters oriented in different corresponding directions.

In addition to the separation of the source component in the spatial domain as performed by the SSP filter, it may be desirable to implement SSP module SM10 to separate the source component in one or more other domains as well. FIG. 13C shows a block diagram of an implementation SM20 of SSP module SM10 that includes an SSP filter SF10 as described herein and a domain-selective filter DF10. Filter DF10 is configured to process the spatially separated source component produced by SSP filter SF10 in order to separate it in one or more additional domains. In one example, filter DF10 is implemented to perform a voice activity detection (VAD) operation on the spatially separated source component to separate speech-active frames from speech-inactive frames (e.g., in the time domain).

Such a VAD operation may be based on one or more factors such as frame energy, signal-to-noise ratio, periodicity, autocorrelation of speech and/or residual (e.g., linear prediction coding residual), zero crossing rate, and/or first reflection coefficient. Such classification may include comparing a value or magnitude of such a factor to a threshold value and/or comparing the magnitude of a change in such a factor to a threshold value. Alternatively or additionally, such classification may include comparing a value or magnitude of such a factor, such as energy, or the magnitude of a change in such a factor, in one frequency band to a like value in another frequency band. It may be desirable to implement filter DF10 to perform voice activity detection based on multiple criteria (e.g., energy, zero-crossing rate, etc.) and/or a memory of recent VAD decisions. One example of a voice activity detection operation that may be performed by filter DF10 includes comparing highband and lowband energies of the spatially separated source component to respective thresholds as described, for example, in section 4.7 (pp. 4-49 to 4-57) of the 3GPP2 document C.S0014-C, v1.0, entitled "Enhanced Variable Rate Codec, Speech Service Options 3, 68, and 70 for Wideband Spread Spectrum Digital Systems," January 2007 (available online at www-dot-3gpp-dot-org).

Additionally or alternatively, filter DF10 may be implemented to perform a linear predictive coding (LPC) analysis operation on the spatially separated source component to support separation of speech content in the LPC and/or time domain. In one such example, filter DF10 is implemented to separate speech frames from other content based on, e.g., formant structure (e.g., a bandwidth that is not too narrow and/or not too wide) and/or spectral tilt. In another example, filter DF10 is implemented to calculate a pitch frequency estimate from the LPC residual and to separate particular speech frames from other content based on an indicated pitch frequency range (e.g., to select only speech from a male speaker, only speech from a female speaker, or only crying or other vocalisations from an infant). Such selection may be indicated by a user (e.g., via a user interface of device PD10). A pitch estimation procedure is described, for example, in section 4.6.3 (pp. 4-44 to 4-49) of EVRC (Enhanced Variable Rate Codec) document C.S0014-C, available online at www-dot-3gpp-dot-org. Such LPC analysis may also be used to separate speech frames from a particular person from other speech content.

Additionally or alternatively, filter DF10 may be implemented to produce source component SC10 by processing the spatially separated source component to separate only speech content in an indicated spoken language (e.g., English only, or Korean only). The language to be selected may be indicated by a user (e.g., via a user interface of device PD10). For example, filter DF10 may be implemented to use hidden Markov model (HMM) processing to identify frames of the separated source component that are likely to include content in the indicated language.

Augmentation module AM10 is configured to perform an augmentation operation on source component SC10 to produce a target component and to produce an augmented signal SG10 that is based on the target component. FIG. 13B shows a block diagram of an implementation AM20 of augmentation module AM10 that is configured to output target component TC10 as augmented signal SG10. Augmentation module AM20 includes a source processing module PM10 that is configured to process source component SC10 to produce target component TC10 by increasing a perceptibility of source component SC10.

Examples of operations that may be performed by source processing module PM10 to increase a perceptibility of source component SC10 include, without limitation, the following: amplification, equalization, dereverberation, noise reduction, speech speed alteration, and speech pitch shifting. Such operations may be selected and/or configured by the user via, e.g., a user interface of device PD10 (for example, a touchscreen display).

Source processing module PM10 may be implemented to dereverberate source component SC10 by inverse filtering the component using an estimated room transfer function. It may be desirable to perform such inverse filtering without whitening source component SC10. In one example, the background component from which source component SC10 is spatially separated is used to estimate the inverted room transfer function.

Source processing module PM10 may be implemented to equalize source component SC10 according to the user's preference and/or to compensate for a hearing loss of the user (e.g., to boost high frequencies). In another example, source processing module PM10 is implemented to perform a psychoacoustic bass enhancement (PBE) operation by harmonically extending low-frequency content of source component SC10. Such an operation may enhance perceptibility and/or directability of the low-frequency content.

Source processing module PM10 may be implemented to perform a noise reduction operation on source component SC10. Such an operation may include, for example, reducing a level of source component SC10 during non-speech intervals and/or spectral subtraction of a noise estimate from source component SC10, where the noise estimate is calculated in the frequency domain as a time average over non-speech intervals and/or based on a spectrum of a component arriving from a non-speech direction (e.g., the background component from which source component SC10 is spatially separated).

Source processing module PM10 may be implemented to perform a speech speed alteration operation on source component SC10. Such an operation, which is performed by expanding or compressing a speech signal in time, is typically used to slow the speed of the speech content and typically includes an LPC analysis operation to separate the formant structure from the residual, which provides pitch information. Source processing module PM10 may be implemented to perform such slowing by extending the length of each frame, inserting pitch periods into voiced speech segments and similarly extending unvoiced speech segments (e.g., using a random excitation signal), and performing an LPC synthesis operation to reproduce the speech content at the desired speed. Such slowing may also include replacing silence periods with the time-expanded speech content. Such a speech speed alteration operation may be configured by the user by selecting a speed alteration factor (e.g., 0.7, 0.75, 0.8, 0.9, 1.1, 1.2, 1.25, 1.3, etc.).

Source processing module PM10 may be implemented to perform a speech pitch shifting operation on source component SC10 to change a pitch frequency of the speech content. Source processing module PM10 may be implemented to perform such an operation by performing an LPC analysis operation to extract the pitch information, compressing or expanding the residual signal without changing the length of the frame, and performing an LPC synthesis operation to reproduce the speech content with the desired pitch. Such a speech speed alteration operation may be configured by the user by selecting a desired pitch range or pitch alteration factor (e.g., in a range of 0.5, 0.7, or 0.8 to 1.2, 1.4, 1.5, 1.7, or 2).

Augmentation module AM10 (or AM20) may be configured to include an automatic gain control (AGC) module that is arranged to compress the dynamic range of augmented signal SG10. Such a module may be configured to provide a headroom definition and/or a master volume setting. Alternatively or additionally, augmentation module AM10 (or AM20) may be configured to include a peak limiter that is arranged to limit the level of augmented signal SG10.

Audio output stage AO10 is configured to combine anti-noise signal SA10 and augmented signal SG10 to produce an audio output signal SO10. For example, audio output stage AO10 may be implemented as a mixer that is configured to produce audio output signal SO10 by mixing anti-noise signal SA10 with augmented signal SG10. Audio output stage AO10 may also be configured to produce audio output signal SO10 by converting antinoise signal SA10, augmented signal SG10, or a mixture of the two signals from a digital form to an analog form and/or by performing any other desired audio processing operation on such a signal (e.g., filtering, amplifying, applying a gain factor to, and/or controlling a level of such a signal). Audio output stage AO10 may also be configured to provide impedance matching to a loudspeaker, an audio-frequency transmission path that leads to a loudspeaker, and/or other electrical, optical, or magnetic interface that is arranged to receive or transfer audio output signal SO10 (e.g., an audio output jack, or an interface to a wireless transmission circuit).

It may be desirable to implement AR processing module AR10 (e.g., to implement augmentation module AM10 or AM20) to perform an SSP operation on augmented signal SG10 to produce a binaural audio output. For example, it may be desirable to produce augmented signal SG10 as a stereo signal to provide a perceived direction of arrival that resembles the original direction of the source component. Such a configuration may enhance the user's augmented reality experience by producing a binaural cue that corresponds to the real environment (e.g., as perceived visually). FIG. 14C shows a block diagram of an implementation A220 of apparatus A210 that includes such an implementation AR14 of AR processing module AR12. In such case, AR processing module AR14 may include an implementation of augmentation module AM10 (or AM20) that performs a beamforming or gain difference (e.g., balance control) operation to produce augmented signal SG10 as a stereo pair of channels SG10$a$ and SG10$b$, based on similar directional information obtained (e.g., as described herein) from the multichannel input signal.

Use cases for an implementation of method M100 include many valuable applications to increase a perceptibility of a source component of the multichannel signal. One such application is directionally selective amplification, which may be referred to colloquially as a "bionic ear." Another such application is the live replacement of a received speech signal with a version that has been, for example, translated, slowed, equalized, and/or amplified. Processing of the captured environmental sounds (i.e., by the headset or by a processing device to which the headset is coupled) to produce an augmented signal by increasing a perceptibility of a separated source component may include one or more of the following operations: separating the captured sounds by sources or direction of arrival; identifying sources of interests according to one or more criteria (e.g., direction, distance, speech recognition, sound classification); enhancing, transforming, blocking, passing, or otherwise modifying the separated stream; and/or applying useful signal processing on a selected stream (e.g., personalized equalization, slowing speech, pitch shifting, and/or language translation). Such processing may also include mixing the processed sounds and playing the resulting augmented signal into the user's ear.

In a "bionic ear" application, the user of apparatus A100 perceives that specific sounds from the environment become more perceptible while other sounds are blocked and/or become much less perceptible. FIGS. 16A and 16B show an example in which an implementation of method M100 is performed to support a "bionic ear" application. FIG. 16A depicts what happens in this example in the real environment: speaker B asks "Can you come over here, Grandma?" and the user A is unable to hear or understand speaker B's speech due to interfering sounds arriving from other directions.

Figure 19:
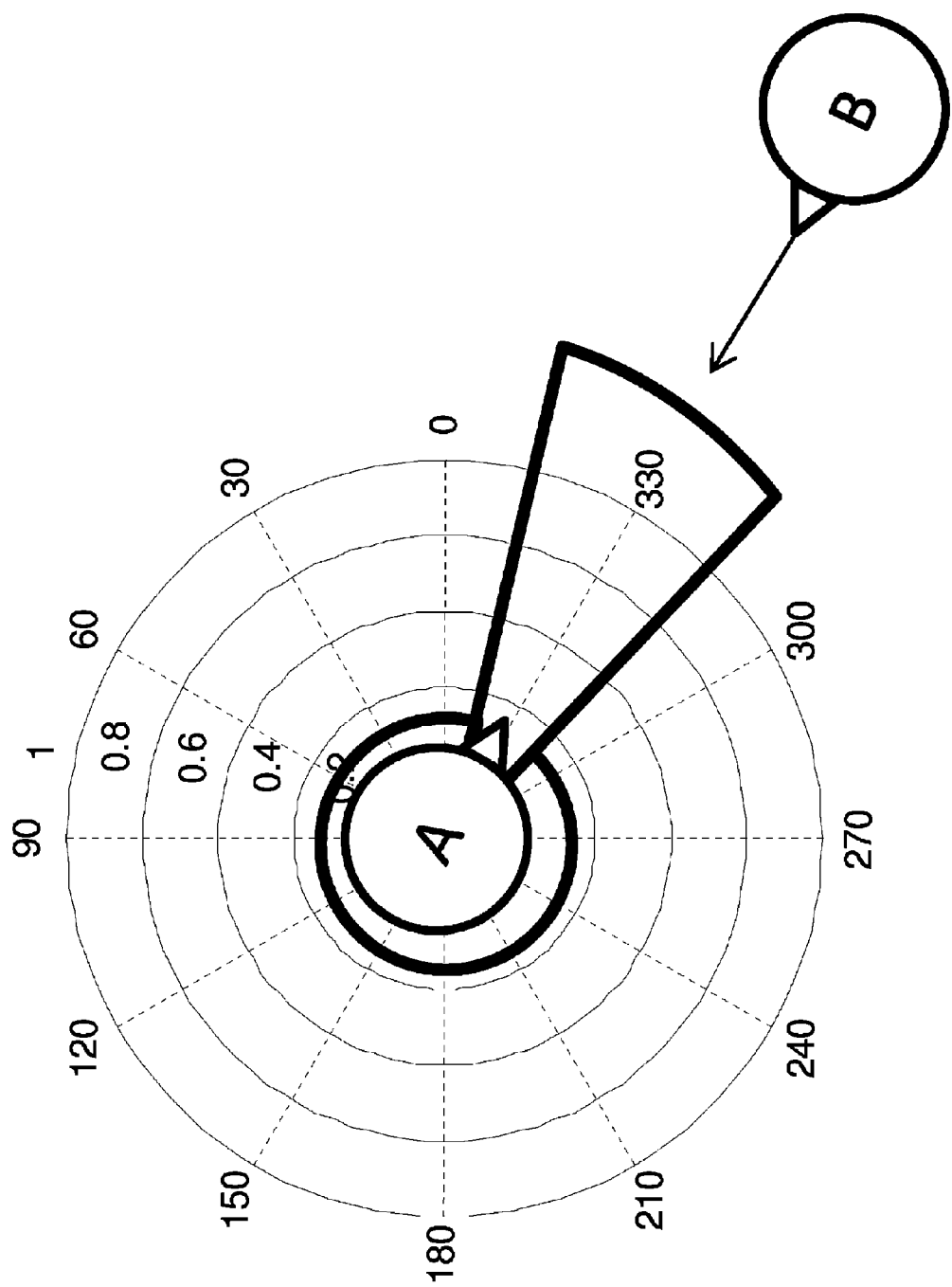
FIG. 19 shows an example of a spatial pattern of perceived sound gain for a user A.

FIG. 16B depicts what user A hears in the same scenario with augmented reality: an amplified version of speaker's B request, with the other sounds being attenuated. In this example, ANC filter AF10 blocks the environmental sounds, and AR processing module AR10 performs multi-microphone spatially selective processing to separate sounds from one or more specific sources or directions. Such a technique may be used to obtain a spatial audio gain pattern as shown in FIG. 19 by amplifying sounds from a specific source (speaker B) into user A's ear, but blocking generic environmental sounds from passing to user A's ear. The result is that user A hears little environmental sound except sounds from a specific source (or direction), which are processed and played through a loudspeaker of the ANC device. Other use cases for such a "bionic ear" application include amplifying the voice of a teacher or lecturer in real time while suppressing ambient noise.

Figure 17B:
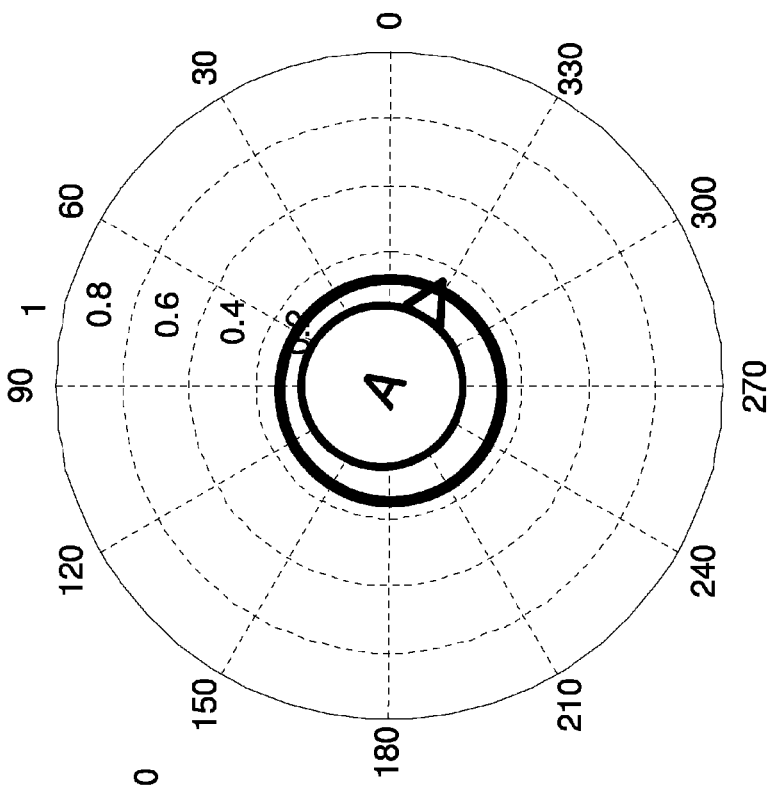
FIG. 17B shows an example of a spatial pattern of perceived sound gain for a user A.
Figure 17A:
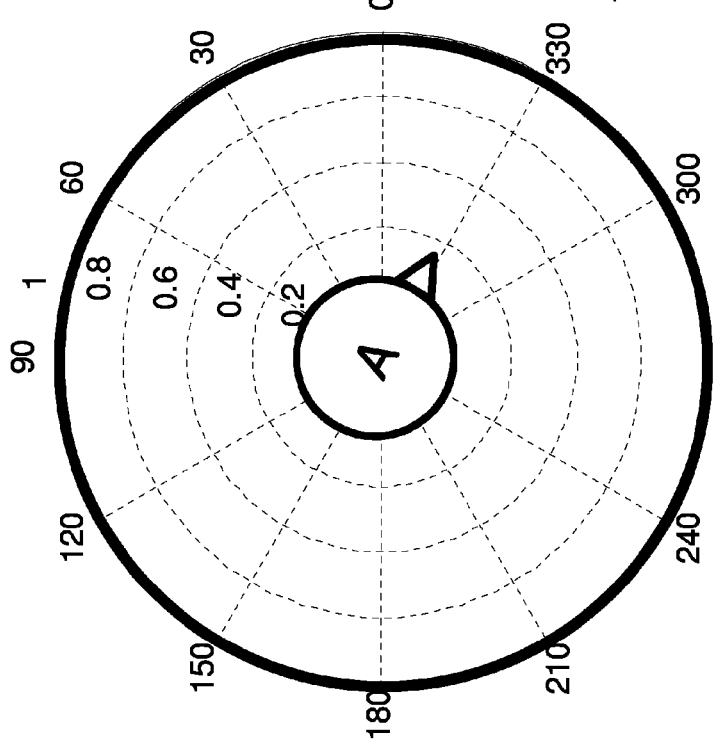
FIG. 17A shows an example of a spatial pattern of perceived sound gain for a user A with bare ears.

FIG. 17A shows an example of a spatial pattern of perceived sound gain for a user A with bare ears. In this example, a gain of one is equivalent to a normal hearing condition. FIG. 17B shows an example of a spatial pattern of perceived sound gain for the user A using a binaural implementation of an ANC device as described herein (e.g., a pair of headsets, headphones, or earbuds with an implementation of apparatus A200). This figure shows an example of a spatial audio gain pattern as produced using ANC filters AF10 and AF20, in which the perceived gain of the ambient environment is reduced at the user's ears.

Figure 18B:
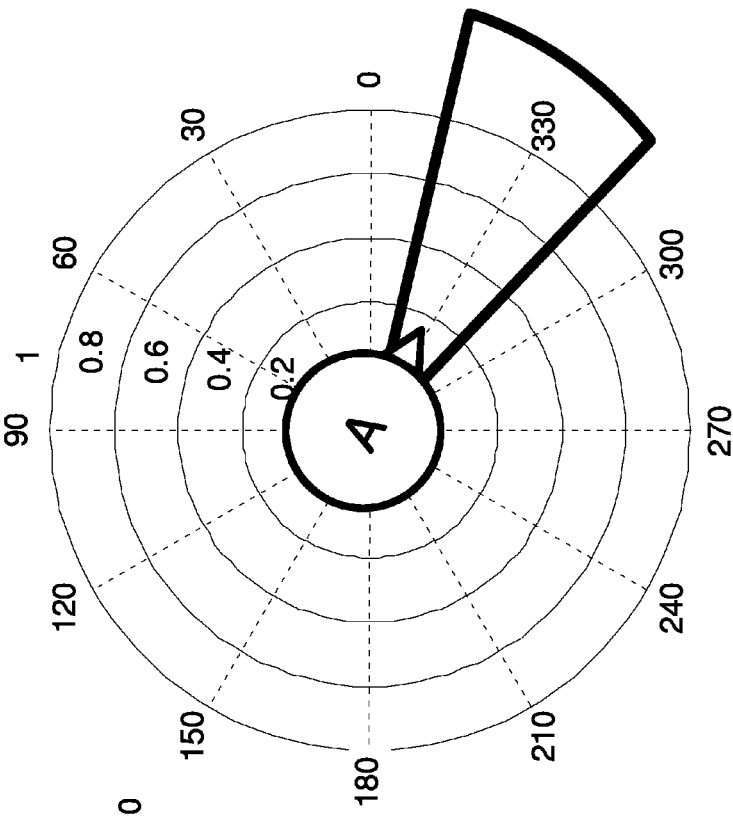
FIG. 18B shows an example of a spatial pattern of perceived audio gain for a target component.
Figure 18A:
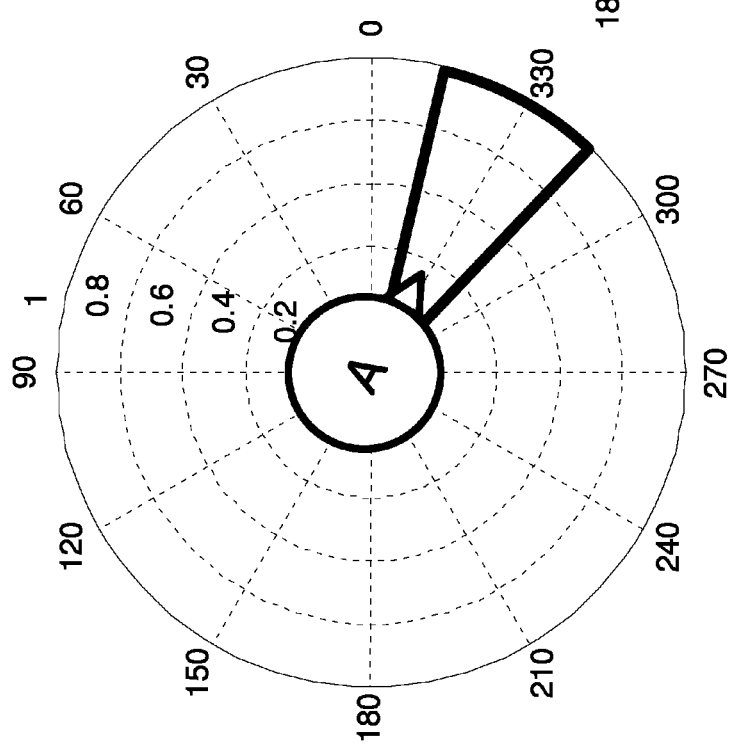
FIG. 18A shows an example of a spatial pattern of perceived audio gain for a separated source component.

FIG. 18A shows an example of a spatial pattern of perceived audio gain for a separated source component as produced by a directionally selective implementation of a multi-microphone signal processing operation of task T200. In this example, sound arriving from a frontal direction of the user is passed with normal gain while sounds arriving from other directions are blocked. FIG. 18B shows an example of a spatial pattern of perceived audio gain for a target component that is produced by amplifying the source component.

In this "bionic ear" example, a microphone array that includes the ANC reference microphone picks up the environmental sound X (=speaker B's speech Y+other directional and diffuse environmental sound Z) and produces audio input signals SI10 and SI20. AR processing module AR10 performs multi-microphone spatially selective processing to separate the speech component Y (i.e., source component SC10) from the other sound component Z. AR processing module AR10 also processes speech signal Y to produce target speech signal Y'. In this case, such processing includes amplifying speech component Y and may also include equalizing component Y, dereverberating component Y to simulate a near distance, and/or slowing down the speech content of component Y (e.g., by 25% or 50%). The spatially selective processing reduces the level of the remaining sound component Z to produce a scaled component Z' (=aZ, where a <<1), and AR module AR10 generates augmented signal X' (=Y'+Z') into the ANC headset. The ANC headset generates an antinoise signal to block environmental sound X from the ear, and audio output stage AO10 plays augmented signal X' to the user's ear.

The selected source component may be amplified (e.g., as illustrated in FIG. 18B) and/or otherwise processed (e.g., equalized, slowed, pitch-shifted, and/or dereverberated as described herein) to increase a perceptibility of the component.

FIGS. 20A and 20B show an example in which an implementation of method M100 is performed to support translation of live speech from one spoken language to another. FIG. 20A depicts what happens in reality (e.g., speaker B asks " ¿ Habla usted español?"), and FIG. 20B depicts what user A hears with augmented reality (e.g., "Do you speak Spanish?").

An example as shown in FIGS. 20A and 20B may be implemented such that speaker B's original speech is suppressed by the ANC device, but other environmental sounds are passed through (e.g., by multi-microphone-based sidetone mixing) to the user's ear. In this case, user A hears the existing sounds of the ambient environment, except for the speech from speaker B. Processing device PD10 may be configured to perform a multi-microphone SSP technique as described herein (e.g., based on phase differences between channels and/or gain differences between channels) to selectively separate speaker B's speech (e.g., based on estimated direction of arrival). Processing device PD10 may also be configured to extract (e.g., recognize) and translate the speech information and to synthesize a contemporaneous translation result (e.g., through text-to-speech (TTS)). The synthesized TTS sounds are then mixed into the ANC device (optionally with directional cueing).

Augmentation module AM10 (e.g., source processing module PM10) may be implemented to perform contemporaneous speech translation by processing source component SC10 to perform a speech-to-text operation (e.g., using hidden Markov model processing) to recognize the speech content, to translate the recognized text from the source language into the target language, and to perform a text-to-speech operation to produce target component TC10. Augmentation module AM10 may be implemented to produce the translated target component in a user-selected voice or pitch (e.g., in a low-pitched to mid-pitched voice) or to extract and apply one or more characteristics of the original speaker's voice (e.g., pitch frequency). It may be desirable to configure device PD10 to display an icon indicating the particular source language being translated (e.g., a corresponding national flag). In a similar example, user A can hear a contemporaneous version of speaker B's speech that has been slowed down, pitch-shifted, and/or equalized.

Figure 21:
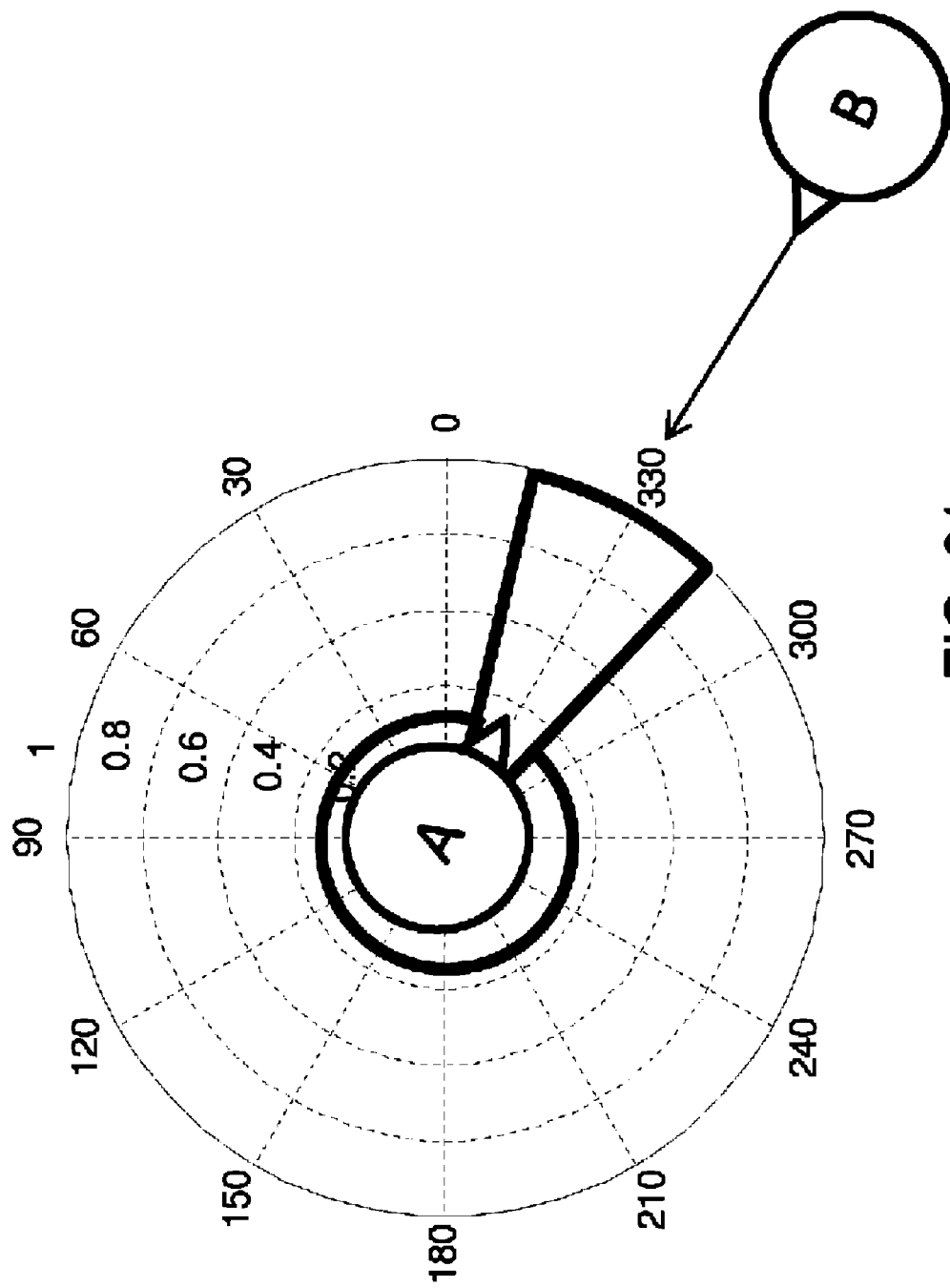
FIGS. 21-24 show examples of spatial patterns of sound gain.

FIG. 18A shows an example of a spatial pattern of audio gain for multi-microphone signal processing. In this example, sound arriving from a frontal direction of the user is passed with normal gain while sounds arriving from other directions are blocked. FIG. 21 shows an application of the example of FIG. 18A to obtain a spatial audio gain pattern that passes sounds from a specific source (speaker B) into user A's ear, but blocks generic environmental sounds from passing to user A's ear.

In this contemporaneous translation example, a microphone array that includes the ANC reference microphone picks up the environmental sound X (=speaker B's speech Y+all other environmental sound Z) and produces audio input signals SI10 and SI20. AR processing module AR10 performs multi-microphone spatially selective processing to separate the speech component Y (i.e., source component SC10) from the other sound component Z. AR processing module AR10 also translates speech signal Y to the target language (e.g., through text-to-speech or "TTS") to produce target speech signal Y' and generates augmented signal X' (=Y'+Z) into the ANC headset. Alternatively or additionally, AR processing module AR10 may be configured to slow down signal Y by 50% to generate Y' and/or to otherwise perform additional perceptibility-increasing processing as described herein (e.g., pitch-shifting, dereverberation) to produce the target component. The ANC headset generates an antinoise signal to block environmental sound X from the ear, and audio output stage AO10 plays augmented signal X' to the ear.

As noted above, audio augmentation may include passing other environmental sounds (e.g., the background component) through to the user's ear with the target component. It may be desirable to apply several signal processing techniques separately to multiple sources of environmental sounds to generate an augmented signal. In one such example, user A is talking with speaker B on a sidewalk near a road. In this case, user A wants to hear speaker B with the voice amplification service (i.e., "bionic ear"), but also still wants to hear the sounds of the sidewalk environment. At the same time user A does not want to hear loud roadside noises generated by cars. An ANC-headset-based augmented reality scheme as described herein can provide such a user experience, as described herein.

Figure 22:
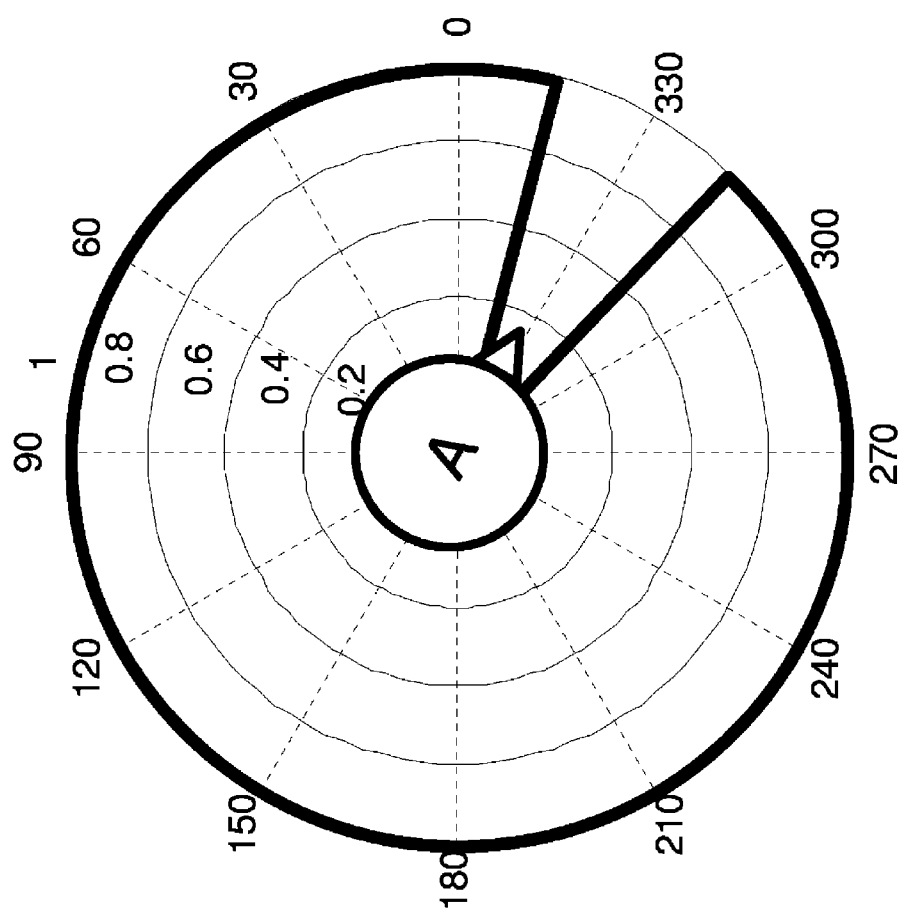
Figure 23:
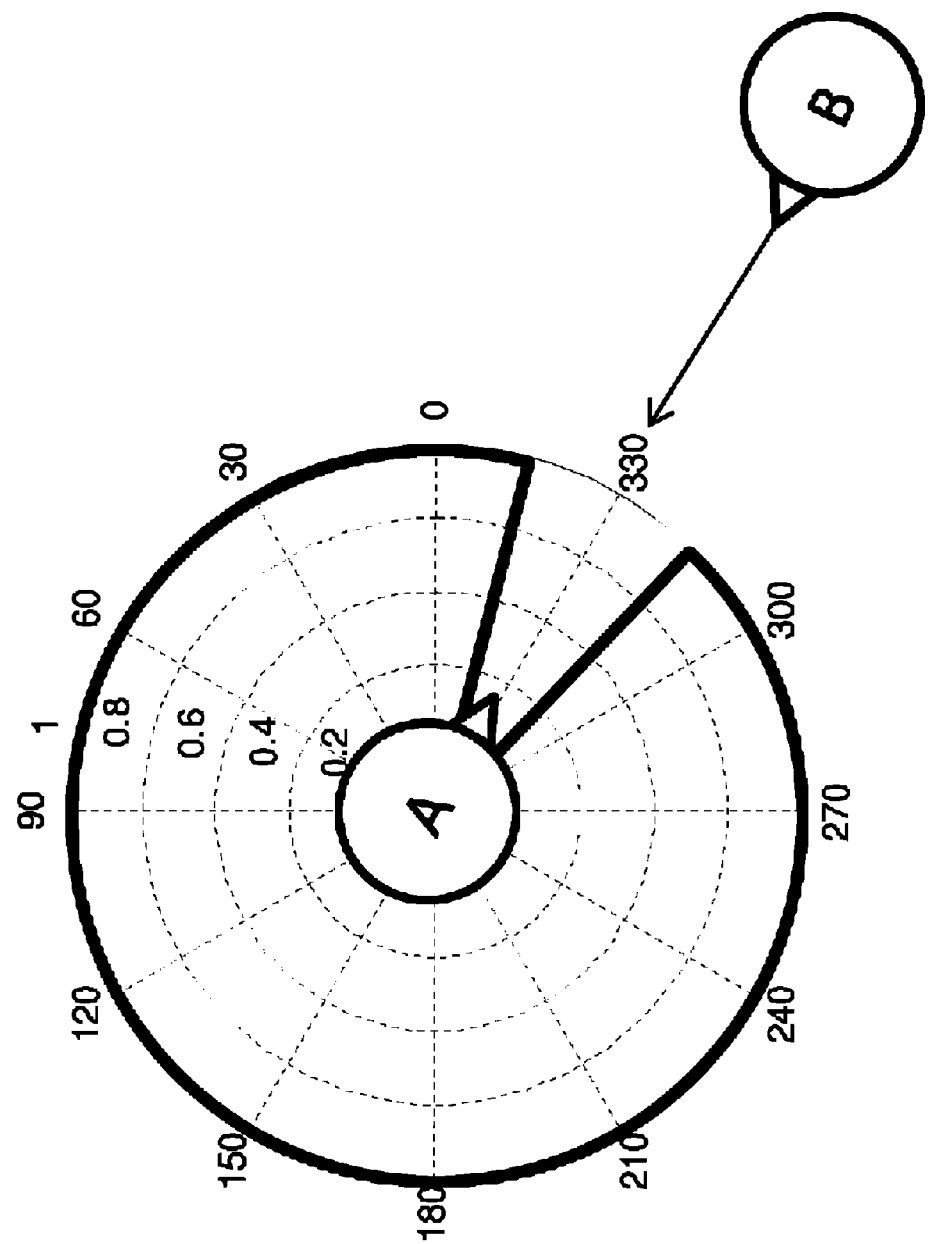

FIG. 22 shows an example of a spatial pattern of audio gain for multi-microphone signal processing. In this example, sound arriving from a frontal direction of the user is blocked while sounds arriving from other directions are passed with normal gain. FIG. 23 shows an application of the example of FIG. 22 to obtain a spatial audio gain pattern that passes environmental sounds to user A's ear, but blocks sound from a specific source (speaker B) from passing to user A's ear. As described with reference to the live translation example above, the missing speech from speaker B can be replaced with a translated version of the speech information (e.g., via TTS).

Figure 24:
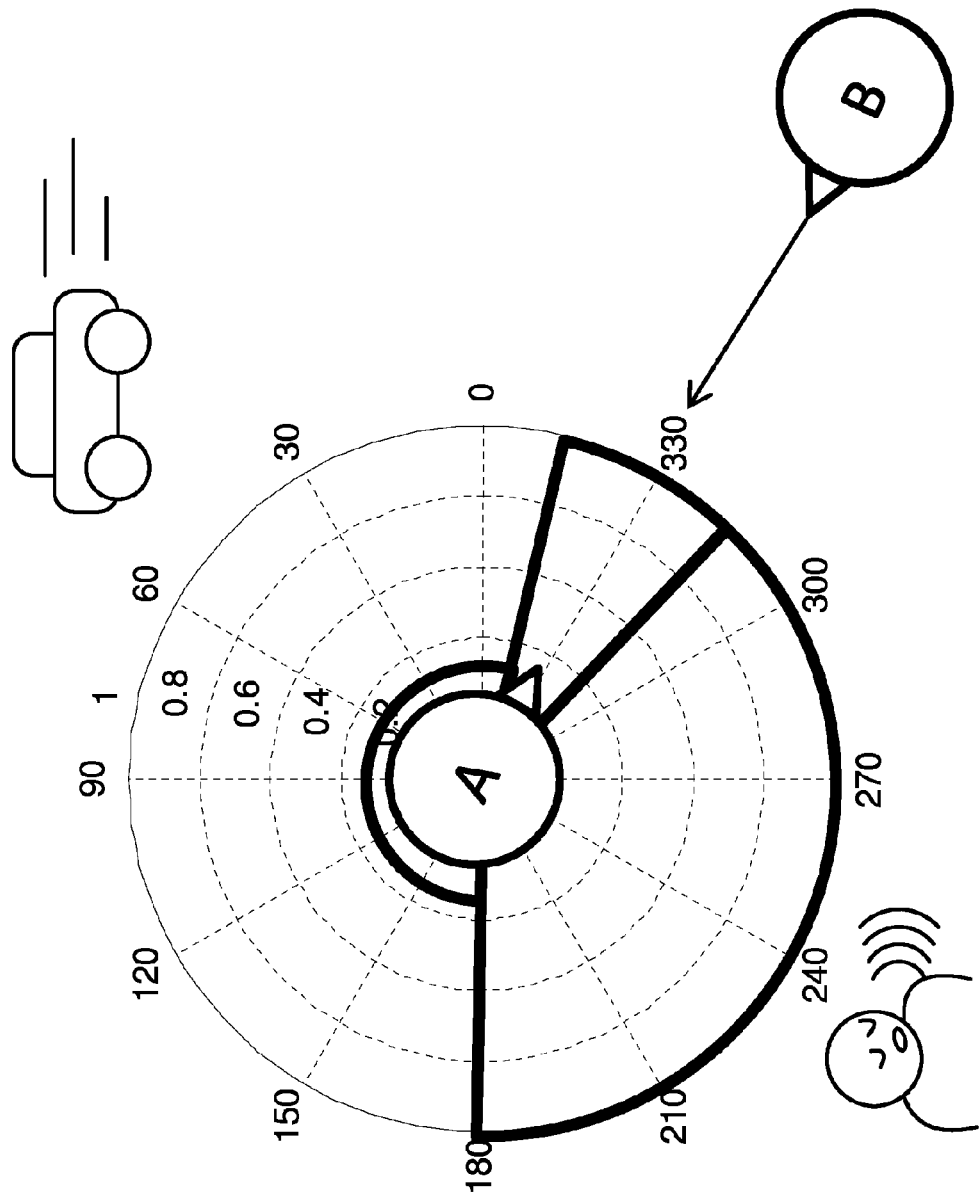

In an example of a combined scenario as illustrated in FIG. 24, sound arriving from a first range of directions is replaced with language translation (e.g., via TTS), sound arriving from a second range of directions is blocked (e.g., road noise), and sound arriving from a third range of directions is passed (e.g., sidewalk sounds). The ANC device passes environmental sounds (e.g., sidewalk sounds) to user A's ear, but the spatially selective processing blocks sound from a specific source (speaker B) and a specific noise direction from going into user A's ear. The augmented processing injects an amplified (and possibly slowed) version of speech from speaker B to user A's ear. User A hears the sidewalk sounds and the processed sounds from speaker B, but little of the car noise from the road.

In this spatially diverse example, a microphone array that includes the ANC reference microphone picks up the environmental sound X (=speaker B's speech Y+sidewalk sound Z+road noise W) and produces audio input signals SI10 and SI20. AR processing module AR10 performs multi-microphone spatially selective processing to separate the speech component Y from user B (i.e., source component SC10), the sidewalk sounds Z from direction C, and the road noise W from direction D. AR processing module AR10 processes (e.g., amplifies, equalizes, dereverberates, and/or slows) speech signal Y to produce target speech signal Y', passes sidewalk sound component Z, and generates augmented signal X' (=Y'+Z) into the ANC device. The ANC device generates an antinoise signal to block environmental sound X from the ear, and audio output stage AO10 plays augmented signal X' to the ear.

Figure 25B:
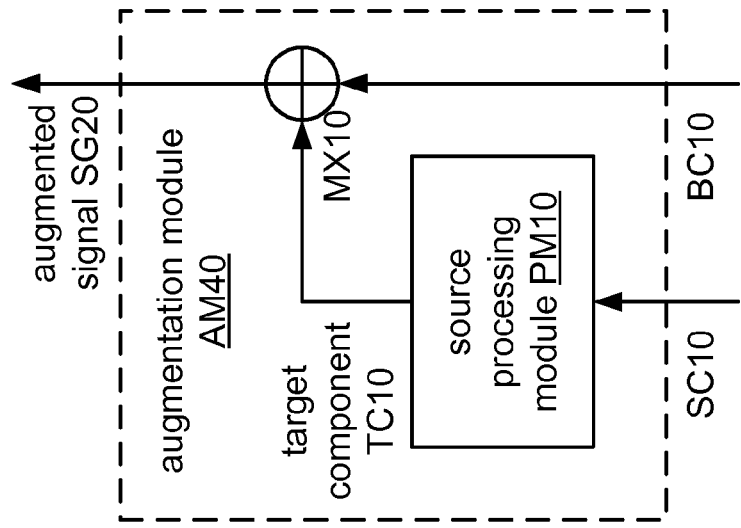
FIG. 25B shows a block diagram of an implementation AM40 of augmentation module AM20 and AM30.
Figure 25A:
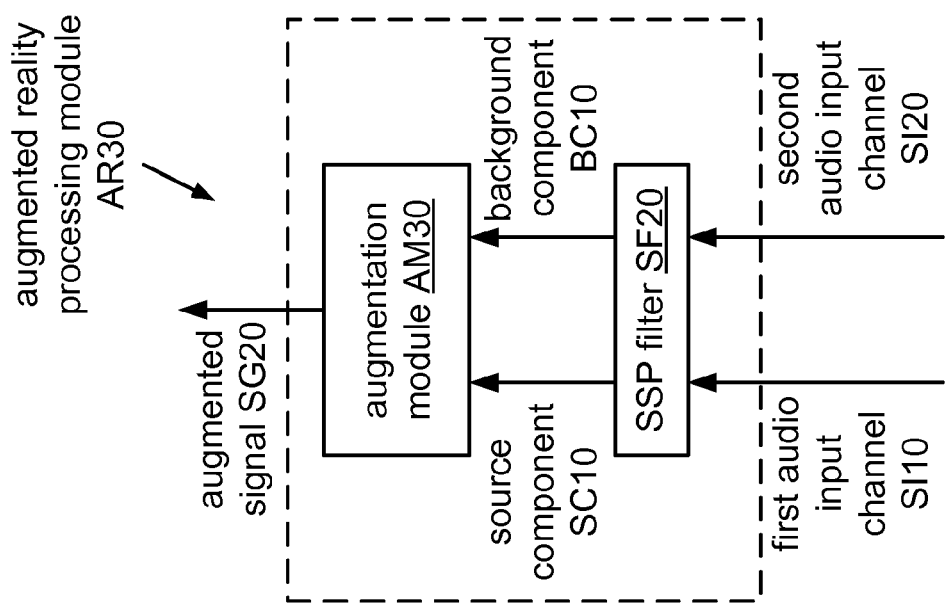
FIG. 25A shows a block diagram of an implementation AR30 of augmented reality processing module AR10.

FIG. 25A shows a block diagram of an implementation AR30 of augmented reality processing module AR10 that includes an implementation SF20 of SSP filter SF10 and an implementation AM30 of augmentation module AM10. Filter SF20 is configured to perform an SSP operation on the multichannel signal to separate source component SC10 from background component BC10. Filter SF20 may be configured to produce background component BC10 as a difference between the multichannel signal and the spatially separated source component (e.g., as the non-selected frequency bins or frames). Alternatively, filter SF20 may be implemented to perform an SSP operation on the multichannel signal to separate background component BC10 from source component SC10 and possibly from other sound. In this case, filter SF20 may be implemented to produce background component BC10 using any of the SSP operations described herein (e.g., based on gain and/or phase differences, beamforming, BSS).

For example, filter SF20 may be implemented to produce background component BC10 from the multichannel signal by applying a beamforming filter having a wide beam in a direction other than the direction of the source component. In another example, filter SF20 is implemented to produce background component BC10 from the multichannel signal by applying one or more beamforming filters having null beams in the directions of sources to be excluded (e.g., in the direction of the source component and/or in the direction of a noise source (e.g., as in the direction D of the source of road noise W in the example discussed above)). Augmentation module AM30 is configured to produce an implementation SG20 of augmented signal SG10 that is based on target component TC10 and on the separated background component BC10.

FIG. 25B shows a block diagram of an implementation AM40 of augmentation module AM20 and AM30 that includes a mixer MX10 configured to mix (e.g., to add) target component TC10 with separated background component BC10 to produce augmented signal SG20.

It may be desirable to implement AR processing module AR10 to detect and pass warning sounds, such as a siren, car horn, alarm, or other sound that is intended to warn, alert, or capture one's attention. Such sounds are typically tonal components that have narrow bandwidths in comparison to other sound signals, such as speech and noise components. FIG. 26A shows a block diagram of an implementation AR100 of AR processing module AR10 that includes a warning sound detector WD10. Warning sound detector WD10 is configured to detect a sound that appears only within a particular frequency range (e.g., from about 500 or 1000 Hertz to about two or three kilohertz), has a narrow bandwidth (e.g., not greater than about fifty, one hundred, or two hundred Hertz), has a sharp attack profile (e.g., has an increase in energy not less than about fifty, seventy-five, or one hundred percent from one frame to the next), and/or has a pitch frequency that is above a threshold value (e.g., the sound of a baby crying). Warning sound detector WD10 may be configured to perform such detection in the time domain, the LPC domain, and/or in a transform domain (e.g., a Fourier or other frequency domain) and to produce a corresponding warning indication SW10. In another example, warning sound detector WD10 is configured to detect the sound of an approaching vehicle by Doppler effect detection.

AR processing module AR100 also includes an implementation AM100 of augmentation module AM10 that is configured to cancel the augmentation of source component SC10 in response to warning indication SW10. AR processing module AR100 may also be configured to override the ANC operation in response to warning indication SW10 and/or to provide an additional audio indication to the user (e.g., to generate an alarm sound).

The detection performed by warning sound detector WD10 may be non-directional (e.g., on one audio input channel, separately on two or more audio input channels, and/or on a sum of more than one audio input channel). Alternatively, detector WD10 may be implemented to indicate a direction of the warning sound to augmentation module AM100 for selection and/or augmentation (e.g., amplification) of the detected warning sound. In a binaural implementation, such augmentation may include directional cueing to indicate the direction of arrival of the warning sound to the user. In such case, it may be desirable not to override the ANC operation and/or to perform a PBE operation on the warning sound to enhance directivity of low frequencies.

Additional enhancements to method M100 and/or apparatus A100 may include audio translation of the written environment (e.g., audio translation of signs in another language). Additional applications include a virtual sound cane configured to produce a change in pitch to indicate physical obstacles, as a navigation aid to a vision-impaired user.

FIG. 26B shows a block diagram of an apparatus MF100 according to a general configuration. Apparatus MF100 includes means F100 for performing an active noise cancellation operation on the first audio input channel to produce an antinoise signal (e.g., as described herein with reference to implementations of task T100 and/or ANC filter AF10). Apparatus MF100 also includes means F200 for processing the multichannel signal to obtain a source component, including means for performing a spatially selective processing operation on the multichannel signal to separate the source component from a background component (e.g., as described herein with reference to implementations of task T200 and/or SSP module SM10). Apparatus MF100 also includes means F300 for processing the obtained source component to produce a target component (e.g., as described herein with reference to implementations of task T300 and/or augmentation module AM10). Apparatus MF100 also includes means F400 for combining the antinoise signal and an augmented signal that is based on the target component to produce an audio output signal (e.g., as described herein with reference to implementations of task T400 and/or audio output stage AO10).

Figure 28C:
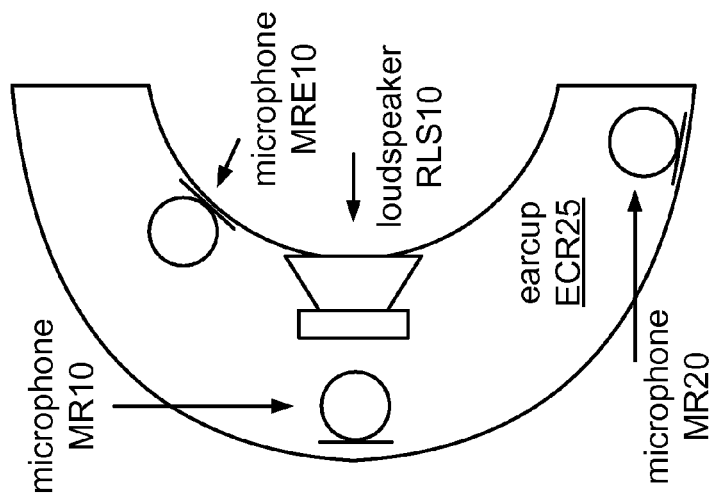
FIGS. 28A-C show implementations EB32, ECR15, and ECR25 of earbud EB30 and earcups ECR20 and ECR20, respectively.
Figure 28B:
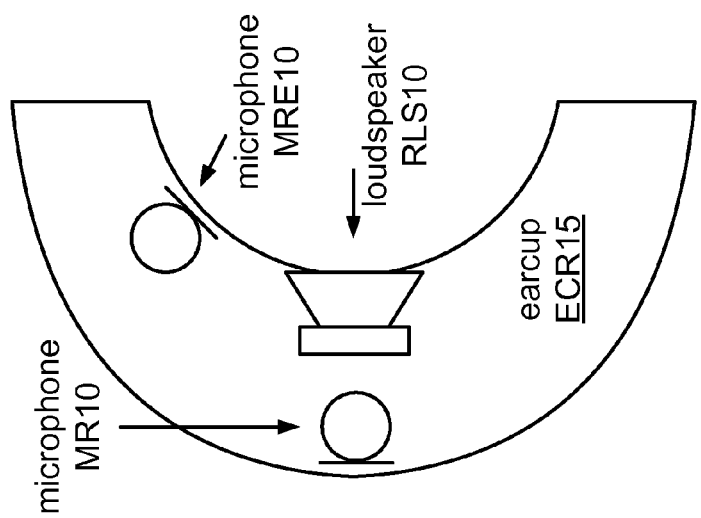
Figure 28A:
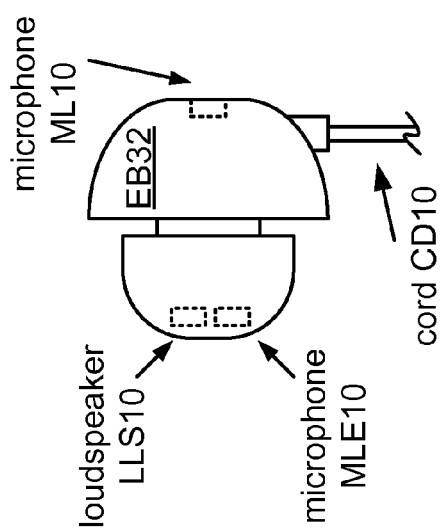

FIG. 27A shows a block diagram of a general ANC system. Adaptive filter W(z) is used to estimate the primary path transfer function P(z) from a reference microphone (e.g., microphone ML10 or MR10), which detects the external noise to be cancelled, to an error microphone, which is closer to the user's ear canal than the reference microphone (e.g., is within the ear canal, is directed at the ear canal, and/or is within the acoustic field emitted by the loudspeaker) and detects the acoustic error at the user's ear. It may also be desirable to estimate the secondary path transfer function S(z), which includes the electrical and acoustic path from the antinoise signal generated by filter W(z) to the error signal used to adapt filter W(z). For example, the filtered-X LMS algorithm adapts filter W(z) based on the error signal and on a version of the reference signal that is filtered by an estimate of S(z). Additionally or alternatively, it may be desirable to account for the feedback path transfer function F(z) from the antinoise signal to the reference microphone. Task T100 and/or ANC filter AF10 may be implemented according to any of these ANC principles. For example, FIGS. 27B and 27C show examples of implementations HS15 and HS25 of headsets HS10 and HS20, respectively, that each include an instance of an ANC error microphone ME10, and FIGS. 28A-C show similar implementations EB32, ECR15, and ECR25 of earbud EB30 and earcups ECR20 and ECR20, respectively.

From FIG. 27A, it may be understood that mixing augmented signal SG10 with antinoise signal SA10 may cause augmented signal SG10 to feed back acoustically into the reference signal (e.g., the audio input channel) and/or to feed forward acoustically into the error signal. Consequently, it may be desirable to mix an inverted version of augmented signal SG10 into one or both of the reference signal and the error signal to reduce an effect of augmented signal SG10 on the ANC filter adaptation.

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The foregoing presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as applications for voice communications at sampling rates higher than eight kilohertz (e.g., 12, 16, 32, 44.1, 48, or 192 kHz).

Goals of a multi-microphone processing system as described herein may include achieving ten to twelve dB in overall noise reduction, preserving voice level and color during movement of a desired speaker, obtaining a perception that the noise has been moved into the background instead of an aggressive noise removal, dereverberation of speech, and/or enabling the option of post-processing (e.g., masking and/or noise reduction) for more aggressive noise reduction.

An apparatus as disclosed herein (e.g., apparatus A100, A200, MF100) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein (e.g., apparatus A100, A200, MF100) may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to spatially selective audio augmentation, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., method M100 and other methods disclosed by way of description of the operation of the various apparatus described herein) may be performed by an array of logic elements such as a processor, and that the various elements of an apparatus as described herein may be implemented in part as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable storage medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein (e.g., method M100 and other methods disclosed by way of description of the operation of the various apparatus described herein) may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media, such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device (e.g., a handset, headset, or portable digital assistant (PDA)), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein (e.g., apparatus A100, MF100) may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

What is claimed is:

1. A method of processing a multichannel signal that includes a first audio input channel and a second audio input channel, said method comprising:
   performing an active noise cancellation operation on the first audio input channel to produce an antinoise signal;
   processing the multichannel signal to obtain a source component, said processing including performing a spatially selective processing operation on the multichannel signal to separate the source component from a background component, wherein said spatially selective processing operation is based on at least gain differences between the first and second audio input channels;
   processing the obtained source component to produce a target component; and
   combining the antinoise signal and an augmented signal that is based on the target component to produce an audio output signal.

2. The method of signal processing according to claim 1, wherein said method comprises combining the target component and the separated background component to produce the augmented signal.

3. The method of signal processing according to claim 1, wherein said spatially selective processing operation includes applying a beam in a source direction to produce the source component.

4. The method of signal processing according to claim 1, wherein said spatially selective processing operation includes applying a null beam in the source direction to produce the background component.

5. The method of signal processing according to claim 4, wherein said spatially selective processing operation includes applying a second null beam in a direction of a noise source to produce the background component.

6. The method of signal processing according to claim 1, wherein said spatially selective processing operation is based on at least phase differences between the first and second audio input channels.

7. The method of signal processing according to claim 1, wherein said processing the obtained source component comprises increasing a perceptibility of the obtained source component by at least one among amplifying the separated source component, compressing a dynamic range of the separated source component, dereverberating the separated source component, and altering a frequency spectrum of the separated source component.

8. The method of signal processing according to claim 7, wherein said increasing a perceptibility includes increasing a perceptibility of speech content of the separated source component.

9. The method of signal processing according to claim 8, wherein said increasing a perceptibility of said speech content includes at least one among (A) varying a speed of said speech content and (B) translating said speech content from a first spoken language to a second spoken language that is different from the first spoken language.

10. The method of signal processing according to claim 8, wherein said increasing a perceptibility of said speech content includes producing said target component to have a greater number of pitch periods than said separated source component.

11. The method of signal processing according to claim 1, wherein said method comprises driving a loudspeaker to produce an acoustic signal that is based on the audio output signal, wherein the loudspeaker is disposed to be worn at an ear of a user and directed at an ear canal of the user, and wherein said active noise cancellation operation is based on a signal that is produced by an error microphone, wherein the error microphone is disposed to be directed at the ear canal.

12. The method of signal processing according to claim 1, wherein said performing a spatially selective processing operation on the multichannel signal to separate the source component from the background component includes separating the voice of a person other than the user from the background component.

13. An apparatus for processing a multichannel signal that includes a first audio input channel and a second audio input channel, said apparatus comprising:
   means for performing an active noise cancellation operation on the first audio input channel to produce an antinoise signal;
   means for processing the multichannel signal to obtain a source component, said means for processing including means for performing a spatially selective processing operation on the multichannel signal to separate the source component from a background component, wherein said spatially selective processing operation is based on at least gain differences between the first and second audio input channels;

means for processing the obtained source component to produce a target component; and means for combining the antinoise signal and an augmented signal that is based on the target component to produce an audio output signal.

14. The apparatus according to claim 13, wherein said apparatus includes means for combining the target component and the separated background component to produce the augmented signal.

15. The apparatus according to claim 13, wherein said spatially selective processing operation includes applying a beam in a source direction to produce the source component.

16. The apparatus according to claim 13, wherein said spatially selective processing operation includes applying a null beam in the source direction to produce the background component.

17. The apparatus according to claim 16, wherein said spatially selective processing operation includes applying a second null beam in a direction of a noise source to produce the background component.

18. The apparatus according to claim 13, wherein said spatially selective processing operation is based on at least phase differences between the first and second audio input channels.

19. The apparatus according to claim 13, wherein said means for processing the obtained source component comprises means for increasing a perceptibility of the obtained source component by at least one among amplifying the separated source component, compressing a dynamic range of the separated source component, dereverberating the separated source component, and altering a frequency spectrum of the separated source component.

20. The apparatus according to claim 19, wherein said increasing a perceptibility includes increasing a perceptibility of speech content of the separated source component.

21. The apparatus according to claim 20, wherein said increasing a perceptibility of said speech content includes at least one among (A) varying a speed of said speech content and (B) translating said speech content from a first spoken language to a second spoken language that is different from the first spoken language.

22. The apparatus according to claim 20, wherein said increasing a perceptibility of said speech content includes producing said target component to have a greater number of pitch periods than said separated source component.

23. The apparatus according to claim 13, wherein said apparatus comprises means for driving a loudspeaker to produce an acoustic signal that is based on the audio output signal, wherein the loudspeaker is disposed to be worn at an ear of a user and directed at an ear canal of the user, and wherein said active noise cancellation operation is based on a signal that is produced by an error microphone, wherein the error microphone is disposed to be directed at the ear canal.

24. The apparatus according to claim 13, wherein said performing a spatially selective processing operation on the multichannel signal to separate the source component from the background component includes separating the voice of a person other than the user from the background component.

25. An apparatus for processing a multichannel signal that includes a first audio input channel and a second audio input channel, said apparatus comprising:

an active noise cancellation filter configured to perform an active noise cancellation operation on the first audio input channel to produce an antinoise signal;

an augmented reality processing module configured to process the multichannel signal to obtain a source component, said module including:

a spatially selective filter configured to perform a spatially selective processing operation on the multichannel signal to separate the source component from a background component, wherein said spatially selective processing operation is based on at least gain differences between the first and second audio input channels; and an augmentation module configured (A) to process the obtained source component to produce a target component and (B) to output an augmented signal that is based on the target component; and an audio output stage configured to combine the antinoise signal and the augmented signal to produce an audio output signal.

26. The apparatus according to claim 25, wherein said augmentation module is configured to combine the target component and the separated background component to produce the augmented signal.

27. The apparatus according to claim 25, wherein said spatially selective processing operation includes applying a beam in a source direction to produce the source component.

28. The apparatus according to claim 25, wherein said spatially selective processing operation includes applying a null beam in the source direction to produce the background component.

29. The apparatus according to claim 28, wherein said spatially selective processing operation includes applying a second null beam in a direction of a noise source to produce the background component.

30. The apparatus according to claim 25, wherein said spatially selective processing operation is based on at least phase differences between the first and second audio input channels.

31. The apparatus according to claim 25, wherein said augmentation module is configured to increase a perceptibility of the obtained source component by at least one among amplifying the separated source component, compressing a dynamic range of the separated source component, dereverberating the separated source component, and altering a frequency spectrum of the separated source component.

32. The apparatus according to claim 25, wherein said augmentation module is configured to increase a perceptibility of speech content of the separated source component.

33. The apparatus according to claim 32, wherein said increasing a perceptibility of said speech content includes at least one among (A) varying a speed of said speech content and (B) translating said speech content from a first spoken language to a second spoken language that is different from the first spoken language.

34. The apparatus according to claim 32, wherein said increasing a perceptibility of said speech content includes producing said target component to have a greater number of pitch periods than said separated source component.

35. The apparatus according to claim 25, wherein said audio output stage is configured to drive a loudspeaker to produce an acoustic signal that is based on the audio output signal, wherein the loudspeaker is disposed to be worn at an ear of a user and directed at an ear canal of the user, and wherein said active noise cancellation operation is based on a signal that is produced by an error microphone, wherein the error microphone is disposed to be directed at the ear canal.

36. The apparatus according to claim 25, wherein said performing a spatially selective processing operation on the multichannel signal to separate the source component from the background component includes separating the voice of a person other than the user from the background component.

37. A non-transitory computer-readable storage medium having tangible features that cause a machine reading the features to:
- perform an active noise cancellation operation on the first audio input channel to produce an antinoise signal;
- process the multichannel signal to obtain a source component, said processing including performing a spatially selective processing operation on a multichannel signal that includes a first audio input channel and a second audio input channel to separate the source component from a background component, wherein said spatially selective processing operation is based on at least gain differences between the first and second audio input channels;
- process the obtained source component to produce a target component; and
- combine the antinoise signal and an augmented signal that is based on the target component to produce an audio output signal.

38. The medium according to claim 37, wherein said medium includes tangible features that cause a machine reading the features to combine the target component and the separated background component to produce the augmented signal.

39. The medium according to claim 37, wherein said spatially selective processing operation includes applying a beam in a source direction to produce the source component.

40. The medium according to claim 37, wherein said spatially selective processing operation includes applying a null beam in the source direction to produce the background component.

41. The medium according to claim 40, wherein said spatially selective processing operation includes applying a second null beam in a direction of a noise source to produce the background component.

42. The medium according to claim 37, wherein said spatially selective processing operation is based on at least phase differences between the first and second audio input channels.

43. The medium according to claim 37, wherein said processing the obtained source component comprises increasing a perceptibility of the obtained source component by at least one among amplifying the separated source component, compressing a dynamic range of the separated source component, dereverberating the separated source component, and altering a frequency spectrum of the separated source component.

44. The medium according to claim 43, wherein said increasing a perceptibility includes increasing a perceptibility of speech content of the separated source component.

45. The medium according to claim 44, wherein said increasing a perceptibility of said speech content includes at least one among (A) varying a speed of said speech content and (B) translating said speech content from a first spoken language to a second spoken language that is different from the first spoken language.

46. The medium according to claim 44, wherein said increasing a perceptibility of said speech content includes producing said target component to have a greater number of pitch periods than said separated source component.

47. The medium according to claim 37, wherein said medium includes tangible features that cause a machine reading the features to drive a loudspeaker to produce an acoustic signal that is based on the audio output signal, wherein the loudspeaker is disposed to be worn at an ear of a user and directed at an ear canal of the user, and wherein said active noise cancellation operation is based on a signal that is produced by an error microphone, wherein the error microphone is disposed to be directed at the ear canal.

48. The medium according to claim 37, wherein said performing a spatially selective processing operation on the multichannel signal to separate the source component from the background component includes separating the voice of a person other than the user from the background component.

* * * * *